(12) United States Patent
Kosugi et al.

(10) Patent No.: US 12,406,525 B2
(45) Date of Patent: Sep. 2, 2025

(54) ELECTRONIC APPARATUS AND CONTROL METHOD

(71) Applicant: Lenovo (Singapore) Pte. Ltd., Singapore (SG)

(72) Inventors: Kazuhiro Kosugi, Kanagawa (JP); Masashi Nishio, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 40 days.

(21) Appl. No.: 18/430,929

(22) Filed: Feb. 2, 2024

(65) Prior Publication Data

US 2024/0282141 A1 Aug. 22, 2024

(30) Foreign Application Priority Data

Feb. 21, 2023 (JP) ................. 2023-025183

(51) Int. Cl.
*G06V 40/16* (2022.01)
*H04N 23/11* (2023.01)
*H04N 23/667* (2023.01)

(52) U.S. Cl.
CPC .......... *G06V 40/166* (2022.01); *G06V 40/172* (2022.01); *H04N 23/11* (2023.01); *H04N 23/667* (2023.01)

(58) Field of Classification Search
CPC .. G06V 40/166; G06V 40/172; H04N 23/667; H04N 23/11
See application file for complete search history.

(56) References Cited

U.S. PATENT DOCUMENTS

2024/0346844 A1* 10/2024 Nishimaki ................ G06T 3/60

FOREIGN PATENT DOCUMENTS

| JP | 2016-148895 A | 8/2016 |
|----|---------------|--------|
| JP | 2019-46507 A | 3/2019 |
| JP | 2023-86523 A | 6/2023 |
| WO | 2021/215015 A1 | 10/2021 |

* cited by examiner

*Primary Examiner* — Girumsew Wendmagegn

(74) *Attorney, Agent, or Firm* — Osha Bergman Watanabe & Burton LLP

(57) ABSTRACT

An electronic apparatus includes: a memory which temporarily stores image data of an image captured by an imaging device; and a processor which executes system processing based on a program of a system and processing using the image data. The processor performs: face detection processing having a first detection mode to detect, with a first detection accuracy, a face area with a face captured therein from the image of the image data stored in the memory, and a second detection mode to detect the face area with a second detection accuracy higher than the first detection accuracy; and first area setting processing to set a first area based on the detected face area when the face area is detected in the second detection mode by the face detection processing.

12 Claims, 10 Drawing Sheets

FACE DETECTION EVALUATION VALUE = 70,
FACE DETERMINATION THRESHOLD VALUE = 70

"FACE DETECTION EVALUATION VALUE ≥
FACE DETERMINATION THRESHOLD VALUE"

FACE DETECTION EVALUATION VALUE = 68,
FACE DETERMINATION THRESHOLD VALUE = 70

"FACE DETECTION EVALUATION VALUE <
FACE DETERMINATION THRESHOLD VALUE"

| | STANDARD DETECTION MODE | HIGH-PRECISION DETECTION MODE |
|---|---|---|
| FUNCTION | FACE DETECTION | FACE AUTHENTICATION |
| IMAGE SENSOR | RGB | RGB+IR |
| FRAME RATE | LOW | HIGH |
| RESOLUTION | LOW | HIGH |
| POWER CONSUMPTION | LOW | HIGH |

ELECTRONIC APPARATUS AND CONTROL METHOD

CROSS-REFERENCE TO RELATED APPLICATIONS

This application claims priority to Japanese Patent Application No. 2023-025183 filed on Feb. 21, 2023, the contents of which are hereby incorporated herein by reference in their entirety.

TECHNICAL FIELD

The present invention relates to an electronic apparatus and a control method.

BACKGROUND

There is an electronic apparatus which makes a transition to a usable operating state when a person approaches or to a standby state in which functions except some of the functions are stopped when the person moves away. For example, in Japanese Unexamined Patent Application Publication No. 2016-148895, there is disclosed a technique for detecting the intensity of infrared light using an infrared sensor to detect whether a person is approaching or a person has moved away in order to control the operating state of the electronic apparatus.

In recent years, with the development of computer vision and the like, detection accuracy when detecting a face from an image has been getting higher. Therefore, person detection by face detection is also performed instead of person detection using the infrared sensor. In the person detection by face detection, it can be determined whether or not a person is a user by performing face authentication in addition to simply detecting the person.

For example, it is expected to improve security by performing control not to boot the electronic apparatus when a person other than the user approaches even though booting the electronic apparatus when the user approaches, and control to lock the electronic apparatus to make it unusable (to make a transition to a standby state) when the user has moved away while the electronic apparatus is in operation even if a person other than the user is being detected.

However, the angle of a face capable of performing face authentication is limited to a range of about ±15 angles to the front. When face authentication is performed to boot the electronic apparatus, a user is consciously facing forward, but after the face authentication of the user is successful and the electronic apparatus is booted, since the user may not necessarily be facing forward, the face authentication may be failed even when the user turned slightly to the side. Therefore, it is difficult to perform control to lock the electronic apparatus using face authentication while the electronic apparatus is in operation after bootup.

SUMMARY

One or more embodiments of the present invention provide an electronic apparatus and a control method to improve security using face authentication.

In one or more embodiments, an electronic apparatus includes: a memory which temporarily stores image data of an image captured by an imaging device; and a processor which executes system processing based on a program of a system and processing using the image data, wherein the processor performs face detection processing having a first detection mode to detect, with a first detection accuracy, a face area with a face captured therein from the image of the image data stored in the memory, and a second detection mode to detect the face area with a second detection accuracy higher than the first detection accuracy, first area setting processing to set a first area based on the detected face area when the face area is detected in the second detection mode by the face detection processing, face authentication processing in which when the face area detected by the face detection processing is a second area outside the first area, face authentication is performed based on the face area detected in the second area, and standby state control processing to cause the system to make a transition to a standby state based on the authentication result by the face authentication processing.

An electronic apparatus according to one or more embodiments of the present invention includes: a memory which temporarily stores image data of an image captured by an imaging device; and a processor which executes system processing based on a program of a system and processing using the image data, wherein the processor performs face detection processing to detect an area, in which a face-likeness evaluation value is a first threshold value or more, as a face area from the image of the image data stored in the memory, first area setting processing to set a first area based on the detected face area when the face area in which the evaluation value is a second threshold value or more is detected by the face detection processing, where the second threshold value is higher than the first threshold value, face authentication processing in which when the face area detected by the face detection processing is a second area outside the first area, face authentication is performed based on the face area detected in the second area, and standby state control processing to cause the system to make a transition to a standby state based on the authentication result by the face authentication processing.

In one or more embodiments, the above electronic apparatus may be such that, when two or more face areas are detected in the face detection processing, the processor performs the first area setting processing and the face authentication processing based on one of the two or more face areas.

In one or more embodiments, the above electronic apparatus may also be such that the processor performs the first area setting processing and the face authentication processing based on the largest face area among the two or more face areas.

In one or more embodiments, the above electronic apparatus may further be such that the processor performs the first area setting processing and the face authentication processing based on a face area closest to the center of the image among the two or more face areas.

Further, in one or more embodiments, the above electronic apparatus may be such that, after setting the first area in the first area setting processing, the processor changes the position or size of the first area according to a change in the position or size of the face area detected by the face detection processing.

Further, in one or more embodiments, the above electronic apparatus may be such that in the first area setting processing, the processor releases the first area based on the fact that the face area detected by the face detection processing is the second area.

Further, in one or more embodiments, the electronic apparatus may be such that, when the face authentication result based on the face area detected in the second area by the face authentication processing is successful, the processor resets, in the first area setting processing, the first area based on the face area detected in the second area.

Further, in one or more embodiments, the above electronic apparatus may further include a sensor to detect the movement of the electronic apparatus, wherein the processor further performs determination processing to determine whether or not the electronic apparatus is hand-held using the sensor, and when it is determined that the electronic apparatus is hand-held by the determination processing, the processor suspends the execution of the standby state control processing to output information for causing the system to make the transition to the standby state based on the authentication result by the face authentication processing.

Further, in one or more embodiments, the above electronic apparatus may be such that the imaging device includes a first image sensor to image visible light and a second image sensor to image infrared light, and the first detection mode is a detection mode to capture an image using only the first image sensor between the first image sensor and the second image sensor, and the second detection mode is a detection mode to capture an image using at least the second image sensor.

In one or more embodiments, a control method for an electronic apparatus includes: a memory which temporarily stores image data of an image captured by an imaging device; and a processor which executes system processing based on a program of a system and processing using the image data, the control method causing the processor to execute: a face detection step having a first detection mode to detect, with a first detection accuracy, a face area with a face captured therein from the image of the image data stored in the memory, and a second detection mode to detect the face area with a second detection accuracy higher than the first detection accuracy; a first area setting step of setting a first area based on the detected face area when the face area is detected in the second detection mode by the face detection step; a face authentication step in which when the face area detected by the face detection step is a second area outside the first area, face authentication is performed based on the face area detected in the second area; and a standby state control step of causing the system to make a transition to a standby state based on the authentication result by the face authentication step.

In one or more embodiments, a control method for an electronic apparatus includes: a memory which temporarily stores image data of an image captured by an imaging device; and a processor which executes system processing based on a program of a system and processing using the image data, the control method causing the processor to execute: a face detection step of detecting an area, in which a face-likeness evaluation value is a first threshold value or more, as a face area from the image of the image data stored in the memory; a first area setting step of setting a first area based on the detected face area when the face area in which the evaluation value is a second threshold value or more is detected by the face detection step, where the second threshold value is higher than the first threshold value; a face authentication step in which when the face area detected by the face detection step is a second area outside the first area, face authentication is performed based on the face area detected in the second area; and a standby state control step of causing the system to make a transition to a standby state based on the authentication result by the face authentication step.

The above-described aspects of the present invention can improve security using face authentication.

DETAILED DESCRIPTION

Embodiments of the present invention will be described below with reference to the accompanying drawings.

First, an electronic apparatus 1 according to one or more embodiments will be described.

The electronic apparatus 1 according to one or more embodiments is, for example, a laptop PC (Personal Computer).

The electronic apparatus 1 has at least a "normal operating state" and a "standby state" as operating states of a system. The normal operating state is an operating state capable of executing processing without being particularly limited, which corresponds, for example, to S0 state defined in the ACPI (Advanced Configuration and Power Interface) specification.

The standby state is a state in which at least some of functions of the functions of the system are limited, which is, for example, a state where the system is locked. The locked state is a state where a preset image (for example, an image for the lock) to make a content being processed invisible is displayed on a display unit, that is, an unusable state until the lock is released by user authentication or the like. Note that the standby state may be the standby state or a sleep state, a state corresponding to modern standby in Windows (registered trademark), S3 state (sleep state)

defined in the ACPI specification, or the like. In other words, the standby state corresponds, for example, to any one of an operating state lower in power consumption than the normal operating state, a state of making a content being operated on the electronic apparatus 1 invisible to a user, and a state in which the user cannot use the electronic apparatus 1.

A "suspended state" further lower in power consumption than the standby state is included in the system operating states. The suspended state is, for example, a hibernation state, a power-off state, or the like. The hibernation state corresponds, for example, to S4 state defined in the ACPI specification. The power-off state corresponds, for example, to S5 state (shutdown state) defined in the ACPI specification.

In the following, a transition of the system operating state from the standby state or the suspended state to the normal operating state may also be called "boot." For example, since the standby state and the suspended state are lower in the activation level of the operation than the normal operating state, the boot of the system of the electronic apparatus 1 leads to the activation of the operation of the system in the electronic apparatus 1.

Figure 1A:
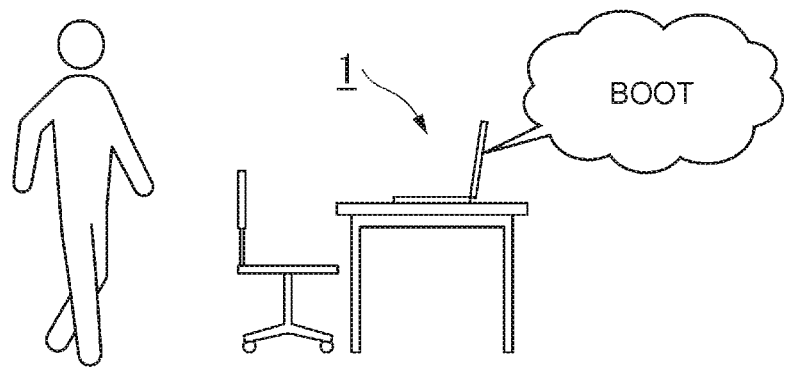
FIGS. 1A-1C are diagrams for describing an overview of HPD processing of an electronic apparatus according to one or more embodiments.
Figure 1B:
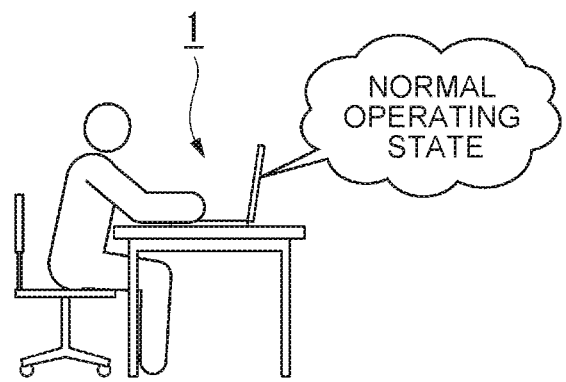
Figure 1C:
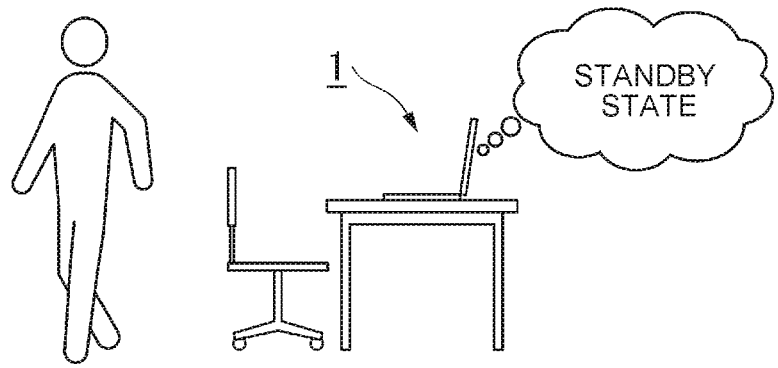

FIGS. 1A-1C are diagrams for describing an overview of HPD processing of the electronic apparatus 1 according to the present embodiment. The electronic apparatus 1 detects a person (that is, a user) present in the neighborhood of the electronic apparatus 1. This processing to detect the presence of a person is called HPD (Human Presence Detection) processing. The electronic apparatus 1 detects the presence or absence of a person by the HPD processing to control the operating state of the system of the electronic apparatus 1 based on the detection result. For example, as illustrated in FIG. 1A, when detecting a change from a state where no person is present in front of the electronic apparatus 1 (Absence) to a state where a person is present (Presence), that is, when detecting that a person has approached the electronic apparatus 1 (Approach), the electronic apparatus 1 determines that the user has approached, and automatically boots the system to make a transition to the normal operating state. Further, in a state where a person is present in front of the electronic apparatus 1 (Presence) as illustrated in FIG. 1B, the electronic apparatus 1 determines that the user is present, and continues the normal operating state. Then, as illustrated in FIG. 1C, when detecting a change from the state where the person is present in front of the electronic apparatus 1 (Presence) to the state where no person is present (Absence), that is, when detecting that the person has left the electronic apparatus 1 (Leave), the electronic apparatus 1 determines that the user has left and causes the system to make a transition to the standby state.

For example, the electronic apparatus 1 has a face detection function to detect a face area with a face captured therein from a captured image that imaged the front (front side) in order to determine whether or not the user is present in front of the electronic apparatus 1. When the face area is detected from the captured image, the electronic apparatus 1 determines that the user is present. On the other hand, when no face area is detected from the captured image, the electronic apparatus 1 determines that the user is not present. In other words, when the face area is detected from the captured image from the state where no face area is detected, the electronic apparatus 1 detects that the user has approached the electronic apparatus 1 (Approach), and causes the system to make the transition to the normal operating state. Further, when the face area is no longer detected from the captured image from the state where the face area is detected, the electronic apparatus 1 detects that the user has left the electronic apparatus 1 (Leave), and causes the system to make the transition to the standby state.

Figure 2:
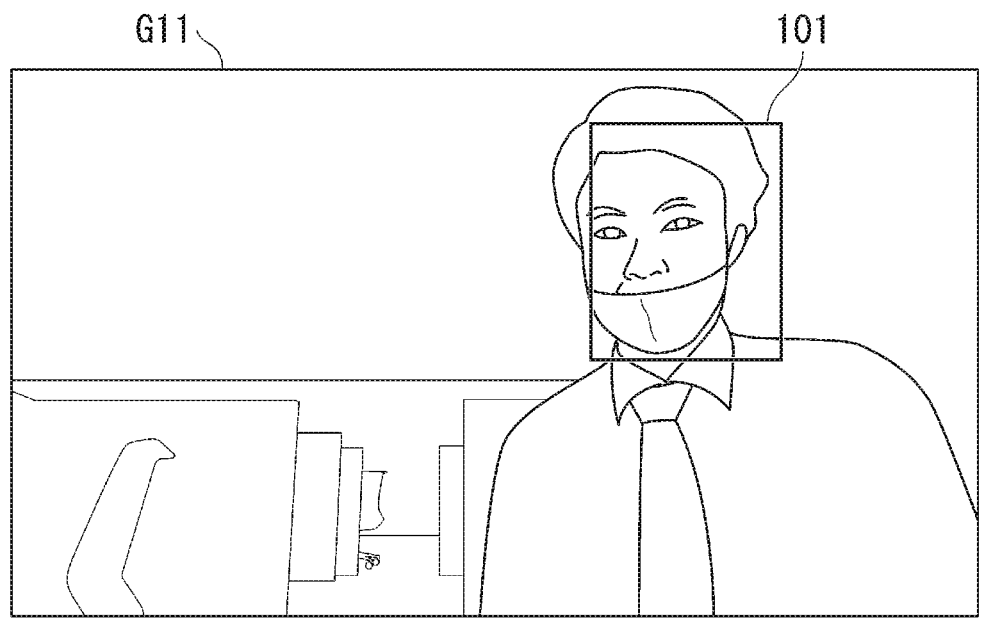
FIG. 2 is a diagram illustrating an example of a captured image with a face area detected therefrom.
Figure 3:
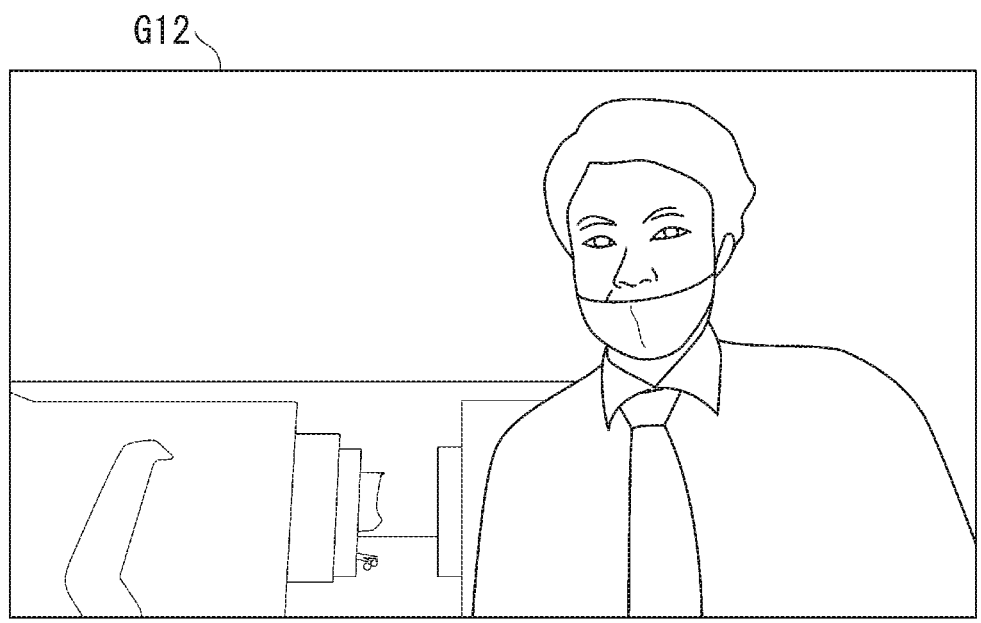
FIG. 3 is a diagram illustrating an example of a captured image with no face area detected therefrom.

Here, when detecting a face area from the captured image, the face area may not be able to be detected correctly due to some factor such as wearing a face mask, and the face detection may become unstable. FIG. 2 and FIG. 3 illustrate examples of captured images for face detection. FIG. 2 is a diagram illustrating an example of a captured image with a face area detected therefrom. On the other hand, FIG. 3 is a diagram illustrating an example of a captured image with no face area detected therefrom.

In FIG. 2, a bounding box 101 represents a face area detected from a captured image G11. As the face area detection method, any detection method using a face detection algorithm for detecting a face based on facial feature information, using trained data (learned model) subjected to machine learning based on the facial feature information, using a face detection library, or the like can be applied. For example, the electronic apparatus 1 uses trained data subjected to machine learning by reading image data of multiple face images to acquire a face-likeness evaluation value (hereinafter called a "face detection evaluation value") from the captured image in order to detect, as a face area, an area in which the face detection evaluation value is a predetermined threshold value (hereinafter called a "face determination threshold value") or more. As an example, when the face determination threshold value is "70," the face detection evaluation value is "70" in the example illustrated in FIG. 2. In this case, since the face detection evaluation value is the face determination threshold value or more, the area is detected as the face area. On the other hand, in the example illustrated in FIG. 3, the face detection evaluation value is "68." In this case, since the face detection evaluation value is less than the face determination threshold value, no area is detected as the face area. The bounding box 101 visualizes coordinate information (coordinate information in the image area) of the position and size (vertical length and horizontal width) of the detected face area. For example, the detection result of the face area is output as information including the coordinate information of the face area and the face detection evaluation value.

Thus, when the face detection evaluation value gets closer to a boundary determined by the face determination threshold value due to some factor such as wearing a face mask, the face detection may become unstable such as to be determined or not to be determined as a face. Note that the factor is not limited to the case of wearing the face mask, and the face detection evaluation value may get closer to the boundary determined by the face determination threshold value due to various factors such as the face orientation and the like. For example, the lower the face determination threshold value, the higher the possibility that an area not being detected as a face area as illustrated in FIG. 3 may be detected as the face area, but on the other hand, the higher the possibility that an area without a face of a person may also be falsely detected as the face area depending on the wrinkles on clothes, the situation of arrangement of things, and the like.

Therefore, in one or more embodiments, when the face area is detected in a detection mode to detect the face area with a detection accuracy higher than that for the face detection in the HPD processing, since it can be determined that the reliability of the detection result is high (that a face is likely to be present), the face determination threshold value for only a specific area based on the detected face area is lowered. Thus, since the possibility that an area with a face of a person therein will be detected correctly as the face area without increasing the possibility that an area without a face of a person therein will be falsely detected as the face area, stable face detection can be realized.

In the following, the face detection mode in the HPD processing is called a "standard detection mode," and the detection mode to detect the face area with a detection accuracy higher than that for the face detection in the HPD processing is called a "high-precision detection mode." Further, a specific area based on the face area detected in the high-precision detection mode (an area in which the reliability of the detection result of the face area is high) is called a "highly reliable area," and the other part of the captured image is called a "standard area."

Figures 4, 5:
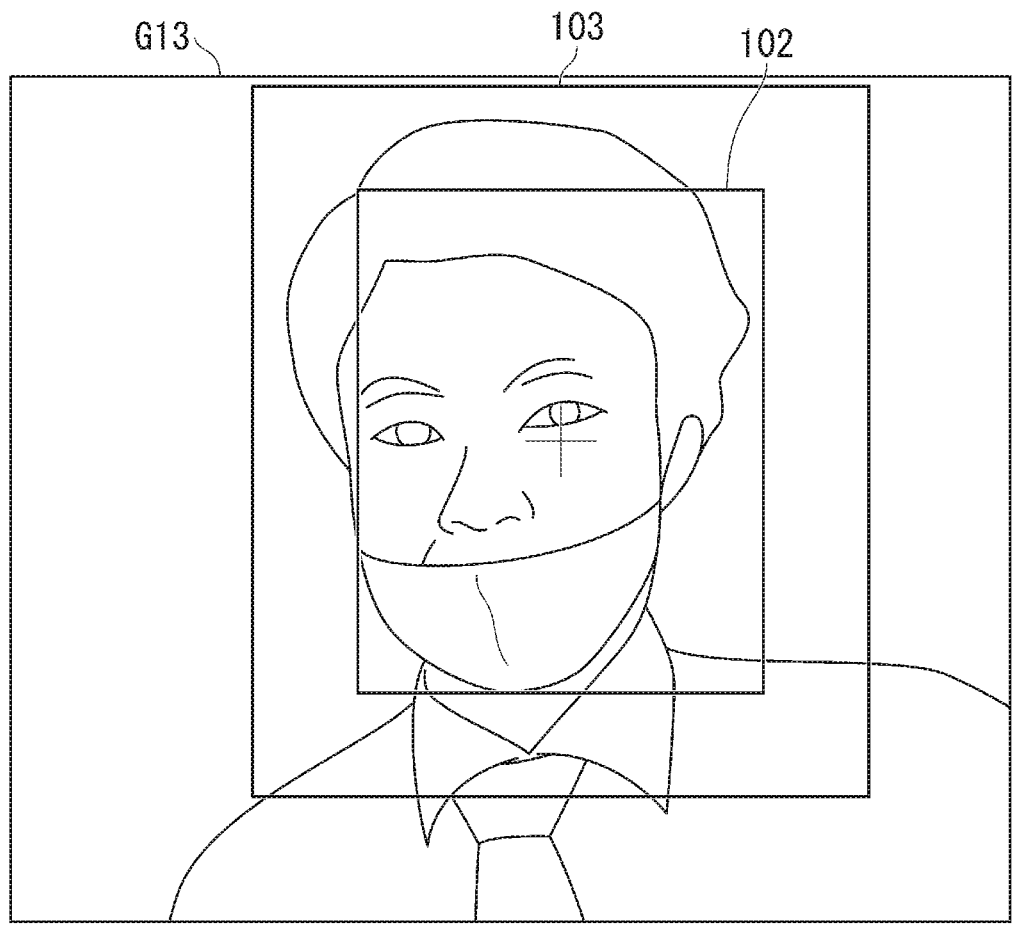
FIG. 4 is a diagram illustrating a setting example of a highly reliable area according to one or more embodiments.
FIG. 5 is a table illustrating an example of comparison between a standard detection mode and a high-precision detection mode according to one or more embodiments.

FIG. 4 is a diagram illustrating a setting example of the highly reliable area according to one or more embodiments. A bounding box 102 represents a face area detected from a captured image G13 in the high-precision detection mode. A highly reliable area 103 is set as an area including this bounding box 102 and wider than the bounding box 102. For example, the highly reliable area 103 is set as a wide area in which a predetermined percentage (for example, 50%) of the vertical length and the horizontal width of the bounding box 102 is added to the vertical length and the horizontal width centered at the center of the bounding box 102. When detecting a face area from a captured image in the standard detection mode in the HPD processing, the face determination threshold value for only the highly reliable area 103 is set low. For example, the face determination threshold value for the highly reliable area 103 is set to a value lower by a predetermined percentage (for example, 10%) than the face determination threshold value for the standard area other than the highly reliable area 103.

For example, when the face determination threshold value for the standard area is "70," the face determination threshold value for the highly reliable area is set to "63." In the examples illustrated in FIG. 2 and FIG. 3, when no highly reliable area is set, the face area may be detected (FIG. 2: face detection evaluation value=70) or the face area may not be detected (FIG. 3: face detection evaluation value=68). However, when the highly reliable area is set and the face determination threshold value therefor is "63," since both of the face detection evaluation values are the face determination threshold value or more, the face area is detected stably.

Note that the face determination threshold value for the standard area does not have to be set to one value, which may be a value changing as appropriate according to the brightness of the captured image and the like. The face determination threshold value for the highly reliable area 103 is set lower by a predetermined percentage (for example, 10%) than the face determination threshold value for the standard area at that time.

Further, the number of face areas detected from a captured image is not limited to one, but even when two or more face areas are detected, the most main face area among the face areas detected from the captured image is set as the highly reliable area. The most main face area is, for example, the largest face area among the face areas detected from the captured image. Further, the most main face area may be determined based on a factor related to a position in the captured image (for example, close to the center) instead of or in addition to the size of the face area.

Referring next to FIG. 5, differences between the standard detection mode and the high-precision detection mode will be described. FIG. 5 is a table illustrating an example of comparison between the standard detection mode and the high-precision detection mode according to one or more embodiments. The standard detection mode is used in a face detection function. On the other hand, the high-precision detection mode is used in a face authentication function. In face authentication processing, since there is a need to check facial features more accurately, the high-precision detection mode is required. For example, when the face authentication function is used in authentication processing at login, authentication processing at the time of accessing access restricted data, and the like, the high-precision detection mode is applied.

Further, in the standard detection mode, an image is captured using, as an image sensor, an RGB sensor to image visible light. On the other hand, in the high-precision detection mode, an image is captured using an IR (Infrared Radiation) sensor to image infrared light in addition to the RGB sensor. Note that only the IR sensor between the RGB sensor and the IR sensor may also be used to capture an image in the high-precision detection mode. Use of the IR sensor makes it possible to capture facial features necessary for face authentication even in a low-illuminance environment, but on the other hand, the power consumption is high because of emitting the infrared light. Further, in the high-precision detection mode, the frame rate is made higher than that in the standard detection mode to detect the face area in order to increase the detection accuracy. Even in this case, the power consumption is increased by an amount of increased frame rate. Note that in the high-precision detection mode, the face area may also be detected in a resolution higher than that in the standard detection mode.

In other words, it can be said that the standard detection mode is a detection mode to capture an image using only the RGB sensor between the RGB sensor and the IR sensor, and the high-precision detection mode is a detection mode to capture an image using at least the IR sensor. Further, it can be said that the standard detection mode is a detection mode lower in power consumed in the face detection processing than that in the high-precision detection mode. Further, it can be said that the standard detection mode is a detection mode for detecting a face area from the captured image, and the high-precision detection mode is a detection mode for detecting a face area from the captured image to be used to perform face authentication.

Although the differences between the standard detection mode and the high-precision detection mode are described with reference to FIG. 5, all of the functions, the image sensors, the frame rates, and the resolutions do not have to be different as long as the high-precision detection mode can detect a face area with an accuracy higher than that in the standard detection mode. For example, the image sensors are different between the standard detection mode and the high-precision detection mode, but either one or both of the frame rate and the resolution may be the same. Further, the image sensors may be the same as long as either one or both of the frame rates and the resolution are different between the standard detection mode and the high-precision detection mode. In any case, power consumption is higher in the high-precision detection mode than in the standard detection mode. Therefore, in the standard detection mode, a face area can be detected by setting a highly reliable area using the detection result in the high-precision detection mode to realize stable face detection without increasing power consumption.

Next, the configurations of the electronic apparatus 1 according to one or more embodiments will be described in detail.

[Appearance Configuration of Electronic Apparatus]

Figure 6:
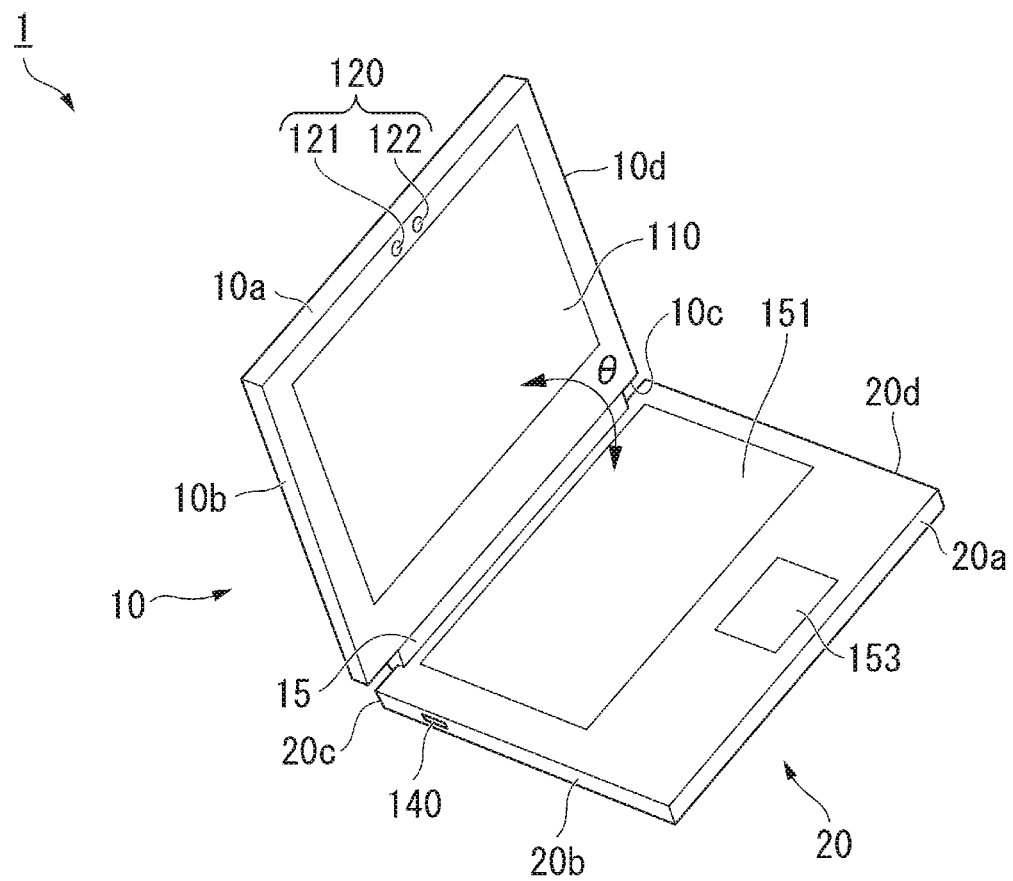
FIG. 6 is a perspective view illustrating an appearance configuration example of the electronic apparatus according to one or more embodiments.

FIG. 6 is a perspective view illustrating an appearance configuration example of the electronic apparatus 1 according to one or more embodiments.

The electronic apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. An open angle by the rotation between the first chassis 10 and the second chassis 20 is denoted by "θ" in FIG. 6.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the electronic apparatus 1 in FIG. 6 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when the user uses the electronic apparatus 1, and the electronic apparatus 1 is often used in a state where the open angle is typically about θ=100° to 130°. Note that the range of open angles θ to be the open state can be set arbitrarily according to the range of angles rotatable by the hinge mechanism 15 or the like.

A display unit 110 is provided on the inner face of the first chassis 10. The display unit 110 is configured to include a liquid crystal display (LCD) or an organic EL (Electro Luminescence) display, and the like. Further, an imaging unit 120 is provided in a peripheral area of the display unit 110 on the inner face of the first chassis 10. For example, the imaging unit 120 is arranged on the side of the side face 10a in the peripheral area of the display unit 110. Note that the position at which the imaging unit 120 is arranged is just an example, and it may be elsewhere as long as the imaging unit 120 can face a direction (frontward) to face the inner face of the first chassis 10.

In the open state, the imaging unit 120 captures an image in a predetermined imaging range in the direction (frontward) to face the inner face of the first chassis 10. The predetermined imaging range is a range of angles of view defined by an image sensor and a lens provided in front of the imaging surface of the image sensor. For example, the imaging unit 120 has two cameras of a first camera 121 and a second camera 122.

The first camera 121 is a camera having, as an image sensor, the RGB sensor for receiving visible light incident through a lens to photoelectrically convert the visible light. Further, the second camera 122 is a camera having, as an image sensor, the IR sensor for receiving infrared light incident through a lens to photoelectrically convert the infrared light. The first camera 121 and the second camera 122 can capture images including a person present in front of the electronic apparatus 1, respectively.

Further, a power button 140 is provided on the side face 20b of the second chassis 20. The power button 140 is an operating element used by the user to give an instruction to power on (transition from the suspended state to the normal operating state) or power off (transition from the normal operating state to the suspended state). Further, a keyboard 151 and a touch pad 153 are provided on the inner face of the second chassis 20 as an input device. Note that a touch sensor may also be included as the input device instead of or in addition to the keyboard 151 and the touch pad 153, or a mouse and an external keyboard may also be connected. When the touch sensor is provided, an area corresponding to the display surface of the display unit 110 may be constructed as a touch panel. Further, a microphone used to input voice may be included in the input device.

Note that, in the closed state where the first chassis 10 and the second chassis 20 are closed, the display unit 110 and the imaging unit 120 provided on the inner face of the first chassis 10, and the keyboard 151 and the touch pad 153 provided on the inner face of the second chassis 20 are covered with each other's chassis faces, respectively. In other words, in the closed state, the electronic apparatus 1 is put in a state of being disabled from fulfilling at least input/output functions.

[Hardware Configuration of Electronic Apparatus]

Figure 7:
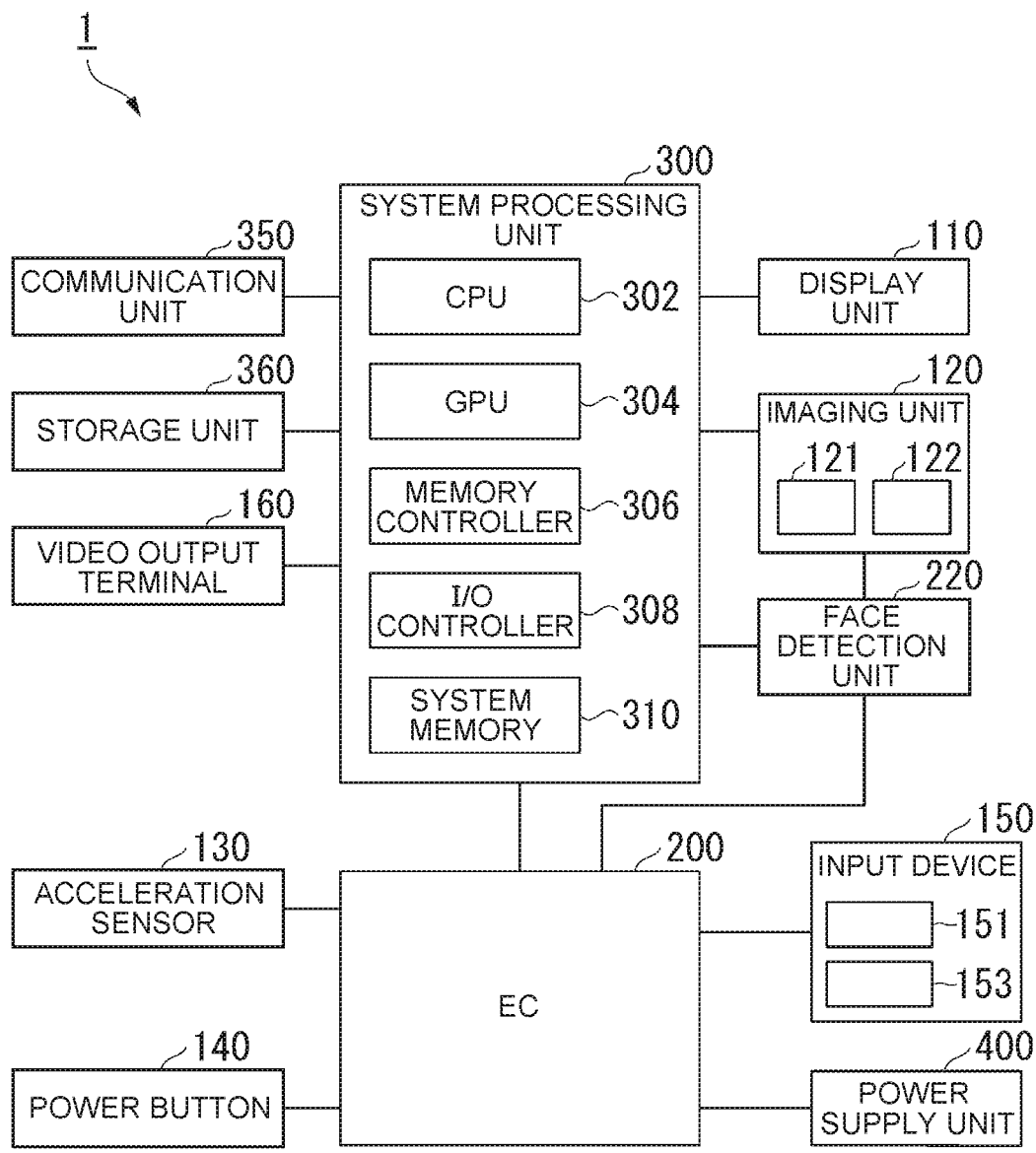
FIG. 7 is a block diagram illustrating an example of the hardware configuration of the electronic apparatus according to one or more embodiments.

FIG. 7 is a block diagram illustrating an example of the hardware configuration of the electronic apparatus 1 according to one or more embodiments. In FIG. 7, components corresponding to respective units in FIG. 6 are given the same reference numerals. The electronic apparatus 1 is configured to include the display unit 110, the imaging unit 120, an acceleration sensor 130, the power button 140, an input device 150, a video output terminal 160, an EC (Embedded Controller) 200, a face detection unit 220, a system processing unit 300, a communication unit 350, a storage unit 360, and a power supply unit 400. The display unit 110 displays display data (images) generated based on system processing executed by the system processing unit 300, processing of an application program(s) running on the system processing, and the like.

The imaging unit 120 has the first camera 121 and the second camera 122, each of which captures an image of an object within a predetermined angle of view in a direction (frontward) to face the inner face of the first chassis 10, and outputs image data of the captured image to the system processing unit 300 and the face detection unit 220, respectively. As described with reference to FIG. 6, the first camera 121 has the RGB sensor for receiving visible light to capture an image. The first camera 121 outputs image data of the captured visible light image (RGB image). Further, the second camera 122 has the IR sensor and a light-emitting part to emit infrared light, where the IR sensor receives reflected light of the infrared light emitted from the light-emitting part to capture an image. The second camera 122 outputs image data of the captured infrared image (IR image). For example, image data of captured images captured by the imaging unit 120 are stored temporarily in a system memory 310 and used for image processing and the like.

Note that the configuration example in which the electronic apparatus 1 includes the two cameras of the first camera 121 having the RGB sensor and the second camera 122 having the IR sensor is described in one or more embodiments, but the present invention is not limited to this example. For example, the electronic apparatus 1 may also be configured to include one camera capable of outputting image data of a visible light image (RGB image) and image data of an infrared image (IR image) by using one image sensor (a so-called hybrid sensor) in which both pixels for receiving visible light and pixels for receiving infrared light are arranged.

The acceleration sensor 130 detects the orientation of the electronic apparatus 1 with respect to the direction of gravity, and outputs a detection signal indicative of the detection result to the EC 200. For example, the acceleration sensor 130 is provided in each of the first chassis 10 and the second chassis 20 to detect each of the orientation of the first chassis 10 and the orientation of the second chassis 20, and to output, to the EC 200, the detection signals indicative of the detection results, respectively. Based on the detection results of the orientation of the first chassis 10 and the orientation of the second chassis 20, the open/closed state of the electronic apparatus 1, the open angle θ between the first chassis 10 and the second chassis 20, and the like can be detected. Note that a gyro sensor, a tilt sensor, a geomagnetic sensor, or the like may also be included instead of or in addition to the acceleration sensor 130.

The power button 140 outputs, to the EC 200, operation signals according to user's operations. The input device 150 is an input unit for accepting user input, which is configured to include, for example, the keyboard 151 and the touch pad 153. In response to accepting operations on the keyboard 151 and the touch pad 153, the input device 150 outputs, to the EC 200, operation signals indicative of the operation contents.

The video output terminal 160 is a connecting terminal for connecting to an external display (display device). For example, the video output terminal 160 is an HDMI (registered trademark) terminal, a USB Type-C terminal, a display port, or the like.

The power supply unit 400 supplies power through a power system for supplying power to each unit according to the operating state of each unit of the electronic apparatus 1. The power supply unit 400 includes a DC (Direct Current)/DC converter. The DC/DC converter converts the voltage of DC power, supplied from an AC (Alternate Current)/DC adapter or a battery pack, to a voltage required for each unit. The power with the voltage converted by the DC/DC converter is supplied to each unit through each power system. For example, the power supply unit 400 supplies power to each unit through each power system based on a control signal input from the EC 200 according to the operating state of each unit.

The EC 200 is a microcomputer configured to include a CPU (Central Processing Unit), a RAM (Random Access Memory), a ROM (Read Only Memory), a flash ROM, multi-channel A/D input terminal and D/A output terminal, digital input/output terminals, and the like. For example, the CPU of the EC 200 reads a control program (firmware) prestored in the own ROM or an external ROM and executes the read control program to fulfill the functionality. The EC 200 is connected to the acceleration sensor 130, the power button 140, the input device 150, the face detection unit 220, the system processing unit 300, the power supply unit 400, and the like.

For example, when receiving an operation signal according to a user's operation on the power button 140, the EC 200 instructs the system processing unit 300 to boot the system or the like. Further, based on the detection result by the face detection unit 220, the EC 200 gives an instruction to boot the system or an instruction to make an operating state transition. Further, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the electronic apparatus 1.

Further, the EC 200 acquires operation signals from the input device 150 and the like, and outputs, to the system processing unit 300, an operation signal required in processing of the system processing unit 300 among the acquired operation signals. Further, the EC 200 acquires the detection signal from the acceleration sensor 130 to detect, based on the acquired detection signal, the orientation of the electronic apparatus 1 (the orientation of the first chassis 10 and the orientation of the second chassis 20), the open angle θ between the first chassis 10 and the second chassis 20, and the like.

Note that some of the functions of the EC 200 may also be configured as a sensor hub or a chipset.

The face detection unit 220 is a processor which processes image data of captured images captured by the imaging unit 120. The face detection unit 220 executes face detection processing and face authentication processing. For example, the face detection unit 220 executes the face detection processing for acquiring a captured image captured by the imaging unit 120 to detect a face area with a face captured therein from the acquired captured image.

Further, based on the detection result of the face detection processing, the face detection unit 220 executes HPD processing to detect whether or not a user (a person) is present in front of the electronic apparatus 1. Further, after detecting the face area from the captured image acquired from the imaging unit 120, the face detection unit 220 matches a face image in the detected face area with a preregistered face image (for example, a face image of an authorized user) to execute face authentication processing. The configuration of this face detection unit 220 will be described in detail later.

The system processing unit 300 is configured to include a CPU (Central Processing Unit) 302, a GPU (Graphic Processing Unit) 304, a memory controller 306, an I/O (Input-Output) controller 308, and the system memory 310, where processing of various application programs on an OS (Operating System) is executable by system processing based on the OS.

The CPU 302 executes processing by the OS and processing by the application programs running on the OS. Further, the CPU 302 causes the operating state of the system to make a transition according to an instruction from the EC 200. For example, when the operating state is the suspended state or the standby state, and a boot instruction is received from the EC 200, the CPU 302 executes boot processing to make the transition from the suspended state or the standby state to the normal operating state. Further, when receiving an instruction to make the transition to the standby state in the normal operating state, the CPU 302 makes the transition from the normal operating state to the standby state. Further, when receiving a shutdown instruction in the normal operating state, the CPU 302 executes shutdown processing to make the transition from the normal operating state to the suspended state.

Further, the CPU 302 executes login processing to determine whether or not to allow use of the OS in the boot processing. When the boot processing by the OS is started, the CPU 302 executes the login processing before allowing the use of the OS, and the transition to the normal operating state is paused until login is allowed in the login processing. In the login processing, user authentication processing is performed to determine whether or not a person using the electronic apparatus 1 is preregistered, authorized user. As the authentication, there are password authentication, face authentication, fingerprint authentication, and the like.

For example, when performing the user authentication processing by face authentication, the CPU 302 uses face authentication processing by the face detection unit 220. When the authentication result is successful, the CPU 302 allows the login and resumes the execution of the paused system processing. On the other hand, when the authentication result is unsuccessful, the CPU 302 does not allow the login and leaves the execution of the system processing paused.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be shared between the CPU 302 and the GPU 304 formed as individual cores, respectively. The number of processors is not limited to one, and it may be plural.

The memory controller 306 controls reading data from and writing data to the system memory 310, the storage unit 360 and the like by the CPU 302 and the GPU 304.

The I/O controller 308 controls input/output of data from the communication unit 350, the display unit 110, and the EC 200.

The system memory 310 is used as a reading area of an execution program of the processor and a working area to write processed data. Further, the system memory 310 temporarily stores image data of a captured image (s) captured by the imaging unit 120.

The communication unit 350 is connected to other devices communicably through a wireless or wired communication network to transmit and receive various data. For example, the communication unit 350 is configured to include a wired LAN interface such as the Ethernet (registered trademark), a wireless LAN interface such as Wi-Fi (registered trademark), and the like.

The storage unit 360 is configured to include storage media, such as an HDD (Hard Disk Drive) or an SDD (Solid State Drive), a ROM, a flash ROM, and the like. The storage unit 360 stores the OS, device drivers, various programs such as applications, and various data acquired by the operation of the programs.

Note that the system processing unit 300 may be configured as a processor in one package of a SoC (System on a Chip), or a chipset, a sensor hub, and the like may be configured as any part other than the CPU 302.

[Configuration of Face Detection Unit]

Next, the configuration of the face detection unit 220 will be described in detail.

Figure 8:
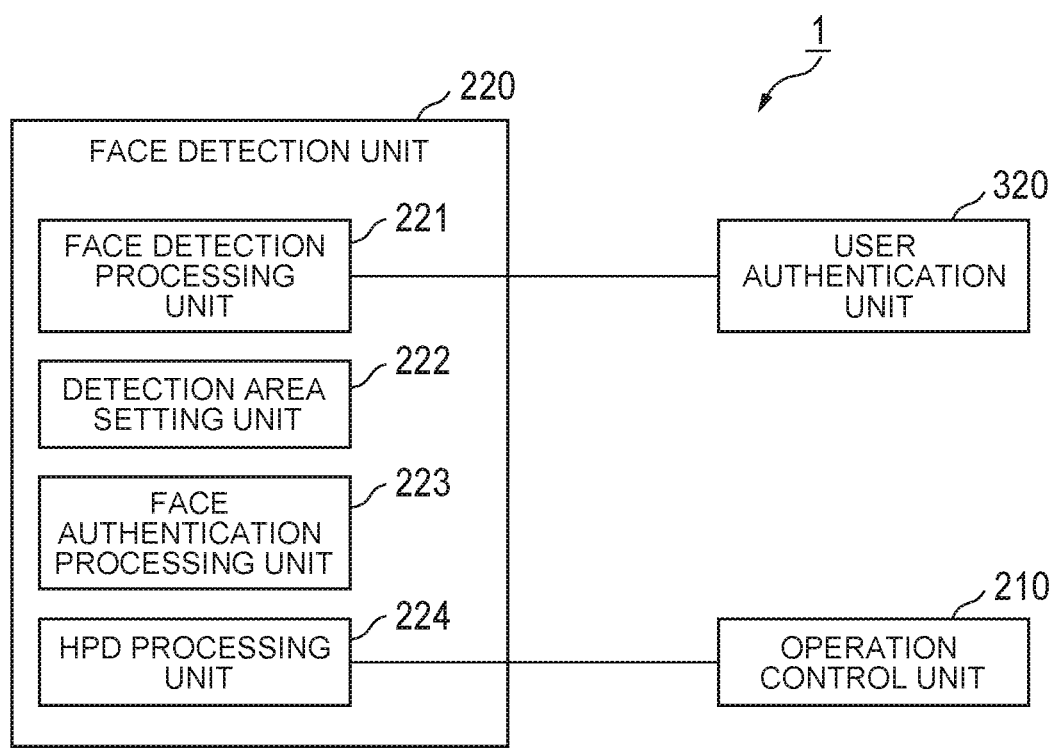
FIG. 8 is a block diagram illustrating an example of the functional configuration of the electronic apparatus according to one or more embodiments.

FIG. 8 is a schematic block diagram illustrating an example of the functional configuration of the electronic apparatus 1 according to one or more embodiments. The face detection unit 220 illustrated is configured to include a processor that processes image data of a captured image captured by the imaging unit 120. The face detection unit 220 acquires the image data of the captured image captured by the imaging unit 120, and temporarily stores the acquired image data in a memory. The memory in which the image data is stored may be the system memory 310, or an unillustrated memory in the face detection unit 220.

The face detection unit 220 processes the image data of the captured image acquired from the imaging unit 120 to perform face detection processing to detect a face area with a face captured therein from the captured image, face authentication processing to authenticate the face in the detected face area, and the like. For example, the face detection unit 220 includes a face authentication processing unit 223, a detection area setting unit 222, a face detection processing unit 221, and an HPD processing unit 224.

The face detection processing unit 221 has the standard detection mode and the high-precision detection mode to detect the face area from the captured image in either mode. As the detection method of the face area, any detection method using a face detection algorithm to detect a face based on facial feature information, using trained data (learned model) subjected to machine learning based on the facial feature information, using a face detection library, or the like can be applied.

For example, in the standard detection mode, the face detection processing unit 221 enables only the first camera 121 between the first camera 121 and the second camera 122 and does not let the second camera 122 emit infrared light. The face detection processing unit 221 reads image data of an RGB image captured by the first camera 121 from the system memory 310. In other words, in the standard detection mode, the face detection processing unit 221 detects a face area from the RGB image. For example, the face detection processing unit 221 detects an area, in which the face detection evaluation value is the face determination threshold value or more, as the face area from the RGB image.

Further, in the high-precision detection mode, the face detection processing unit 221 enables both the first camera 121 and the second camera 122, and lets the second camera 122 emit infrared light. The face detection processing unit 221 reads, from the system memory 310, image data of an RGB image and an IR image captured by the first camera 121 and the second camera 122. In other words, in the high-precision detection mode, the face detection processing unit 221 detects a face area from the RGB image and the IR image. Note that in the high-precision detection mode, the face detection processing unit 221 may also enable only the second camera 122 between the first camera 121 and the second camera 122 to detect the face area from the IR image.

When the face area is detected by the face detection processing unit 221 in the high-precision detection mode, the detection area setting unit 222 sets a highly reliable area based on the face area detected in the high-precision detection mode. For example, the highly reliable area is used when detecting a face area in the standard detection mode. When the highly reliable area is set in the standard detection mode, the detection area setting unit 222 updates the position of the highly reliable area based on the position of the face area detected in the highly reliable area. For example, when the position or size of the highly reliable area changes from the position or size of the face area detected in the highly reliable area, the detection area setting unit 222 changes the position or size of the highly reliable area according to the change in the position or size of the face area. In other words, the detection area setting unit 222 causes the highly reliable area to follow according to the change in the position or size of the face area (face movement) detected in the highly reliable area.

Figure 9B:
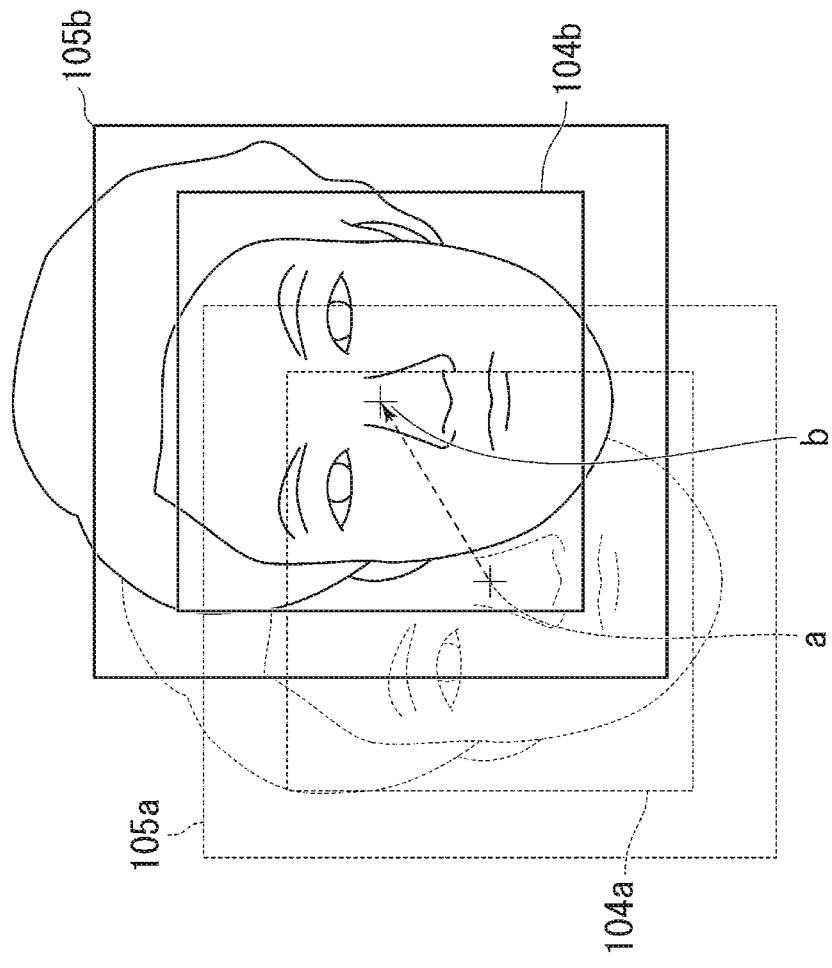
FIGS. 9A-9B are explanatory diagrams of tracking of the highly reliable area according to one or more embodiments.
Figure 9A:
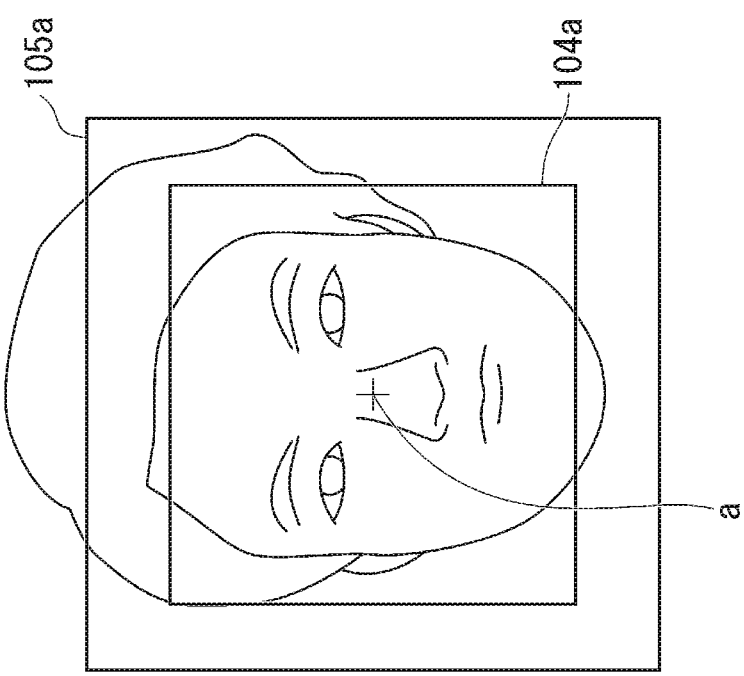

FIGS. 9A-9B are explanatory diagrams of tracking of the highly reliable area according to one or more embodiments. FIG. 9A illustrates a bounding box 104a when a face area centered at a position a is detected, and a highly reliable area 105a set based on the bounding box 104a. Then, as illustrated in FIG. 9B, when the center of the face area is moved from position a to a position b, the bounding box 104a and the highly reliable area 105a move by following the movement of the face area, and become a bounding box 104b and a high reliability area 105b, respectively.

Note that when the face area is no longer detected in the highly reliable area, the detection area setting unit 222 releases the set high reliability area. For example, when the detected face area moves outside the highly reliable area (moves to the standard area), or when the face area is no longer detected, the detection area setting unit 222 releases the set highly reliable area.

Further, when two or more face areas are detected by the face detection processing unit 221, the detection area setting unit 222 sets the highly reliable area based on one of the detected two or more face areas (the most main face area). For example, the detection area setting unit 222 may set the highly reliable area based on the largest face area among the detected two or more face areas. Further, the detection area setting unit 222 may set the highly reliable area based on a face area closest to the center of the captured image among the detected two or more face areas.

Here, when the highly reliable area is set upon detecting a face area from a captured image in the standard detection mode, the face detection processing unit 221 detects a face area under detection conditions different between the highly reliable area and the standard area. Specifically, the face determination threshold value in the highly reliable area is set lower than the face determination threshold value in the standard area. For example, the face determination threshold value in the highly reliable area is set to a value lower by a predetermined percentage (for example, 10%) than the face determination threshold value in the standard area.

Returning to FIG. 8, the face authentication processing unit 223 executes face authentication processing based on the face area detected from the captured image detected by the face detection processing unit 221 in the high-precision detection mode. As the face authentication method, any face authentication method using a face authentication algorithm to perform face authentication by comparing/matching between feature information of the face image of the detected face area and feature information on a face image of a preregistered user, using trained data (learned model) subjected to machine learning based on facial feature information, using a face detection library, or the like can be applied. In other words, when a face area is detected from the captured image, it can be determined whether or not the face is a face of the user based on the authentication result of the face authentication.

For example, the face authentication processing unit 223 executes the face authentication processing in response to a request from the user authentication unit 320 to respond to the user authentication unit 320 about the authentication result. The user authentication unit 320 is a functional component implemented by the system processing unit 300 executing a program of the OS. The user authentication unit 320 performs user authentication processing at login, user authentication processing at the time of access to access-restricted data, and the like based on the authentication result by the face authentication processing unit 223.

Further, after login, while the face area detected by the face detection processing unit 221 detected in the standard detection mode is within the highly reliable area, the face authentication processing unit 223 does not execute the face authentication processing. When the face area detected by the face detection processing unit 221 in the standard detection mode moves outside the highly reliable area, the face detection processing unit 221 performs face detection in the high-precision detection mode. Then, the face authentication processing unit 223 executes the face authentication processing based on a face area detected by the face detection processing unit 221 in the high-precision detection mode.

Based on the detection result of the face area by the face detection processing unit 221 and the authentication result by the face authentication processing unit 223, the HPD processing unit 224 determines whether or not the user is present in front of the electronic apparatus 1. For example, in the case where the system is in the standby state, when the face area is detected by the face detection processing unit 221 in the standard detection mode, the HPD processing unit 224 determines that the user is present in front of the electronic apparatus 1. Further, in the normal operating state after logging into the system, when the face area detected by the face detection processing unit 221 in the standard detection mode is within the highly reliable area, the HPD processing unit 224 determines that a face of the user (that is, that the user is present) without performing face authentication, while when the detected face area is outside the highly reliable area, the HPD processing unit 224 determines whether or not it is the face of the user (that is, whether or not the user is present) based on the face authentication by the face authentication processing unit 223. Then, the HPD processing unit 224 outputs HPD information based on the determination result of whether or not the user is present in front of the electronic apparatus 1.

For example, when the determination result changes from a state where the user is not present to a state where the user is present in front of the electronic apparatus 1, the HPD processing unit 224 outputs HPD information (hereinafter called "Approach information") indicating that the user has approached the electronic apparatus 1. Further, while determining that the user is present in front of the electronic apparatus 1, the HPD processing unit 224 outputs HPD information (hereinafter called "Presence information") indicating that the user is present in front of the electronic apparatus 1. Further, when the detection state changes from the state where the user is present in front of the electronic apparatus 1 to the state where the user is not present, the HPD processing unit 224 outputs HPD information (hereinafter called "Leave information") indicating that the user has left the electronic apparatus 1. Based on the detection result of the face area by the face detection processing unit 221, the HPD processing unit 224 outputs, to the operation control unit 210, the Approach information, the Presence information, or the Leave information.

The operation control unit 210 is a functional component implemented, for example, by the EC 200 executing a control program to acquire the HPD information output from the HPD processing unit 224 in order to control the system operating state based on the acquired HPD information.

For example, when acquiring the Approach information from the face detection unit 220 (the HPD processing unit 224) in the standby state, the operation control unit 210 makes the transition from the standby state to the normal operating state. Specifically, the operation control unit 210 gives an instruction to the system processing unit 300 to boot the system. For example, when booting the system, the operation control unit 210 outputs a control signal to the power supply unit 400 to supply power required for the operation of each unit of the electronic apparatus 1. After that, the operation control unit 210 outputs a boot signal to instruct the system processing unit 300 to boot the system. When acquiring the boot signal, the system processing unit 300 boots the system to make the transition from the standby state to the normal operating state.

Further, in the normal operating state, the operation control unit 210 restricts the system not to make the transition to the standby state while acquiring the Presence information from the face detection unit 220 (the HPD processing unit 224), and continues the normal operating state. Note that even when acquiring the Presence information from the face detection unit 220 (the HPD processing unit 224), the operation control unit 210 may also make the transition from the normal operating state to the standby state depending on given conditions. For example, the given conditions are that the period of time without no user operation input (no operation period of time) is continued for a preset period of time, that an operation to make the transition to the standby state is performed, and the like.

Further, when acquiring the Leave information from the face detection unit 220 (the HPD processing unit 224) in the normal operating state, the operation control unit 210 instructs the system processing unit 300 to cause the system to make the transition from the normal operating state to the standby state. For example, the operation control unit 210 outputs a standby signal to instruct the system processing unit 300 to cause the system to make the transition from the normal operating state to the standby state. When acquiring the standby signal, the system processing unit 300 causes the system to make the transition from the normal operating state to the standby state. After that, the operation control unit 210 outputs, to the power supply unit 400, a control signal to stop the supply of power unnecessary in the standby state.

Note that the operation control unit 210 may also be a functional component such as the chipset, the sensor hub, or the like instead of the EC 200. The unillustrated chipset and sensor hub are processors to transmit and receive data between the CPU 302 and peripheral parts, perform data processing, and the like, which collect data, for example, from the acceleration sensor 130, the face detection unit 220, and the like. For example, the chipset and the sensor hub have some or all of the functions of the memory controller 306 and the I/O controller 308.

[Operation of Face Detection Processing]

Figure 10:
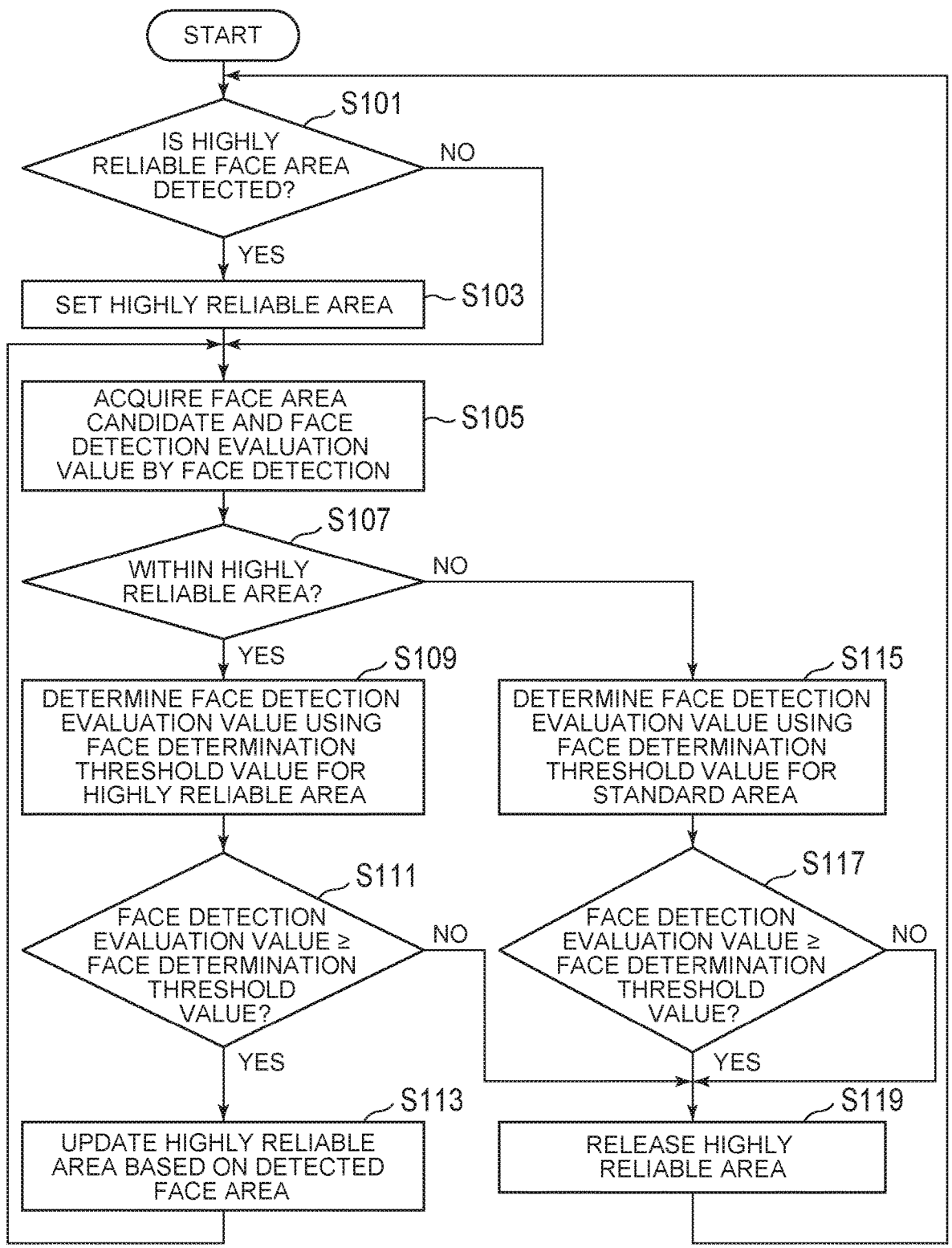
FIG. 10 is a flowchart illustrating an example of face detection processing in the standard detection mode according to one or more embodiments.

Referring next to FIG. 10, the operation of face detection processing in which the face detection unit 220 sets the highly reliable area in the standard detection mode to detect a face area will be described.

FIG. 10 is a flowchart illustrating an example of face detection processing according to one or more embodiments.

(Step S101) The face detection unit 220 determines whether or not a face area in which the face detection result is highly reliable (in which a face is likely to be present) is detected. For example, when the face area is detected in the high-precision detection mode, the face detection unit 220 determines that the face area in which the face detection result is highly reliable is detected. As an example, when the face area is detected in the high-precision detection mode in the face authentication processing at the last login time, the face detection unit 220 determines that the face area in which the face detection result is highly reliable is detected. The last login time is the login time upon booting for transition to the current normal operating state, which means a case where the normal operating state is continued after the login without the transition to the standby state or the suspended state after the login.

Note that even in the standard detection mode, not in the high-precision detection mode, when the face detection evaluation value is high, the face detection unit 220 may also determine that the reliability of the detection result is high (that a face is likely to be present).

When determining that the face area in which the face detection result is highly reliable is detected (YES), the face detection unit 220 proceeds to a process in step S103. On the other hand, when determining that no face area in which the face detection result is detected (NO), the face detection unit 220 proceeds to a process in step S105.

(Step S103) Based on the face area in which the face detection result is highly reliable (for example, the face area detected in the high-precision detection mode), the face detection unit 220 sets the highly reliable area (see FIG. 4). Then the face detection unit 220 proceeds to the process in step S105.

(Step S105) The face detection unit 220 performs face detection processing to detect a face area from a captured image in the standard detection mode. For example, the face detection unit 220 acquires a face area candidate from the captured image and the face detection evaluation value therefor. Note that when two or more face areas are detected from the captured image, the face detection unit 220 acquires the most main face area candidate among the two or more face areas and the face detection evaluation value therefor. Then, the face detection unit 220 proceeds to a process in step S107.

(Step S107) The face detection unit 220 determines whether or not the face area candidate acquired in step S105 is within the highly reliable area. When determining that it is within the highly reliable area (YES), the face detection unit 220 proceeds to a process in step S109. On the other hand, when determining that it is not within the highly reliable area (that is, when determining that it is within the standard area) (NO), the face detection unit 220 proceeds to a process in step S115.

(Step S109) The face detection unit 220 uses the face determination threshold value (for example, "63") for the highly reliable area to determine the face detection evaluation value of the face area candidate in the highly reliable area. Then, the face detection unit 220 proceeds to a process in step S111.

(Step S111) The face detection unit 220 determines whether or not the face detection evaluation value is the face determination threshold value for the highly reliable area or more, and when determining that it is the face determination threshold value for the highly reliable area or more (YES), the face detection unit 220 determines that it is the face area, and proceeds to a process in step S113. On the other hand, when determining that it is less than the face determination threshold value for the highly reliable area (NO), the face detection unit 220 determines that it is not the face area, and proceeds to a process in step S119.

(Step S113) The face detection unit 220 updates the highly reliable area based on the detected face area. For example, when the position or size of the detected face area changes from the position or size of the last detected face area, the face detection unit 220 changes the position or size of the highly reliable area according to the change in the position or size of the face area.

(Step S115) The face detection unit 220 uses the face determination threshold value (for example, "70") for the standard area to determine the face detection evaluation value of the face area candidate outside the highly reliable area (or in a state where no highly reliable area is set). Then, the face detection unit 220 proceeds to a process in step S117.

(Step S117) The face detection unit 220 determines whether or not the face detection evaluation value is the face determination threshold value for the standard area or more, and when determining that it is the face determination threshold value for the standard area or more (YES), the face detection unit 220 determines that it is the face area, and proceeds to the process in step S119. On the other hand, when determining that it is less than the face determination threshold value for the standard area (NO), the face detection unit 220 determines that it is not the face area, and proceeds to the process in step S119.

(Step S119) When the highly reliable area is set, the face detection unit 220 releases the highly reliable area. For example, in the state where the highly reliable area is set, when no face area is detected in the highly reliable area (NO in step S111), when the face area is detected in the standard area (Yes in step S117), or when no face area is detected in both the highly reliable area and the standard area (NO in step S117), the face detection unit 220 releases the highly reliable area. Note that when the highly reliable area is not set (NO in step S101), the face detection unit 220 continues the state where the highly reliable area is not set. Then, the face detection unit 220 returns to the process in step S101.

Figure 11:
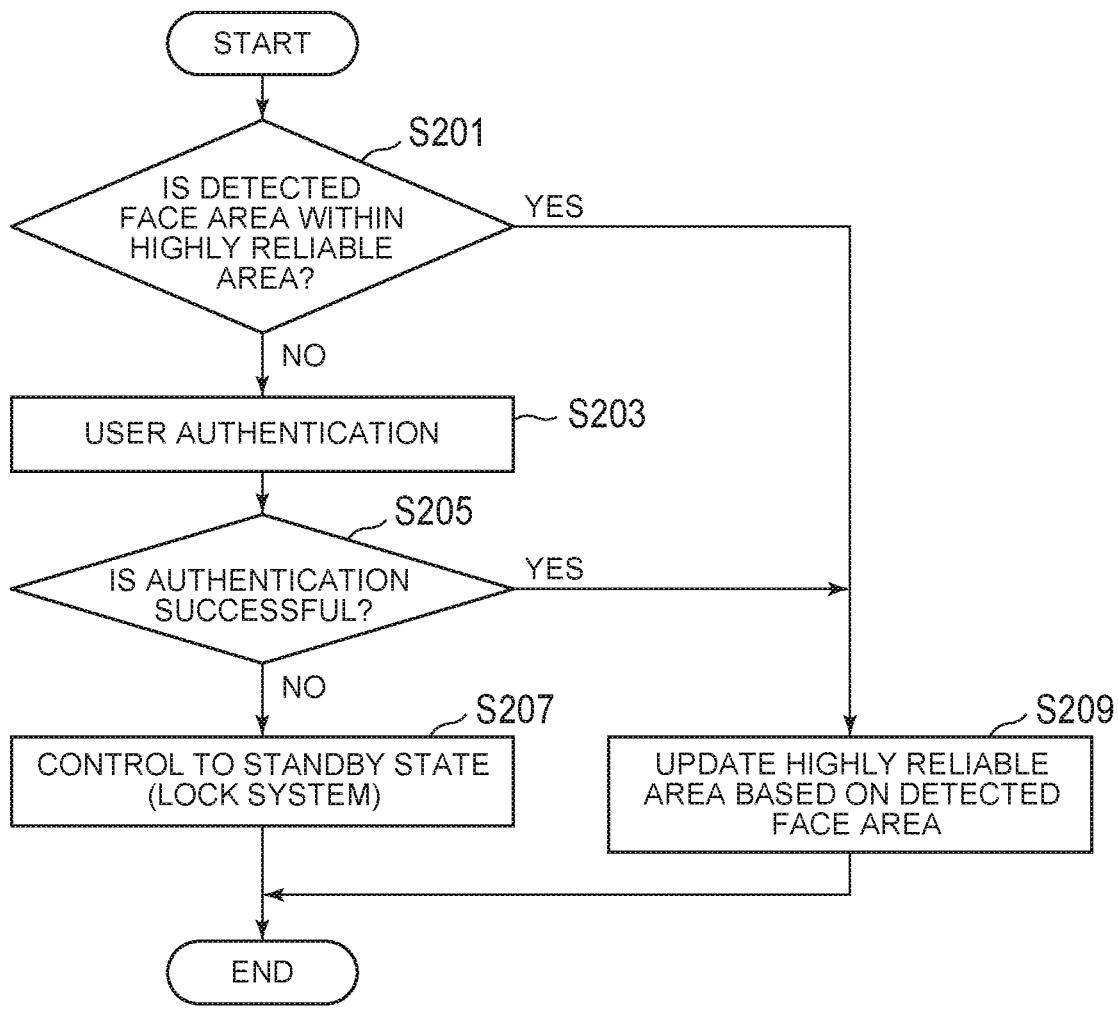
FIG. 11 is a flowchart illustrating an example of standby state control processing according to one or more embodiments.

Referring next to FIG. 11, the operation of standby state control processing in which when the detected face area is outside the highly reliable area (in the standard area), face authentication is performed, and when it is not the user, the system is controlled to the standby state will be described.

FIG. 11 is a flowchart illustrating an example of standby state control processing according to one or more embodiments.

(Step S201) In the normal operating state, the face detection unit 220 determines whether or not the face area (the most main face area) detected from the captured image captured in the standard mode is within the highly reliable area. When determining that the detected face area is outside the highly reliable area (in the standard area) (NO), the face detection unit 220 proceeds to a process in step S203. On the other hand, when determining that the detected face area is within the highly reliable area (YES), the face detection unit 220 proceeds to a process in step S209.

Note that when determining that the detected face area is outside the highly reliable area (in the standard area) (NO) corresponds, for example, to when determining NO in step S107 and YES in step 117 of FIG. 10. On the other hand, when determining that the detected face area is within the highly reliable area (YES) corresponds, for example, to when determining YES in step S107 and step S111 of FIG. 10.

(Step S203) The face detection unit 220 executes face authentication processing to determine whether or not it is a face of the user based on the face area detected from the captured image captured in the high-precision detection mode. Then, the face detection unit 220 proceeds to a process in step S205.

(Step S205) The face detection unit 220 determines whether or not the authentication result of the face authentication processing in step S203 is successful. When determining that the authentication is unsuccessful (NO), the face detection unit 220 proceeds to a process in step S207. On the other hand, when determining that the authentication is successful (YES), the face detection unit 220 proceeds to a process in step S209.

(Step S207) Since the face in the face area detected outside the highly reliable area (in the standard area) is a face other than the face of the user, the face detection unit 220 outputs the Leave information indicating that the user has left the electronic apparatus 1. When acquiring the Leave information from the face detection unit 220, the operation control unit 210 gives an instruction to the system processing unit 300 to cause the system to make the transition from the normal operating state to the standby state. For example, the operation control unit 210 outputs the standby signal to instruct the system processing unit 300 to cause the system to make the transition from the normal operating state to the standby state. When acquiring the standby signal, the system processing unit 300 causes the system to make the transition from the normal operating state to the standby state (for example, to make the system locked).

(Step S209) The face detection unit 220 updates the highly reliable area based on the detected face area. For example, when the determination in step S205 is YES, since the face in the face area detected outside the highly reliable area (in the standard area) is the face of the user, the face detection unit 220 resets and updates the highly reliable area based on the face area concerned. Note that when the determination in step S201 is YES, since the face area is continuously in the highly reliable area based on the detected face area, the face detection unit 220 updates the highly reliable area based on the detected face area. For example, when the position or size of the face area changes from the position or size of the last detected face area, the face detection unit 220 changes the position or size of the highly reliable area according to the change in the position or size of the face area. The process at this time corresponds to the process in step S113 of FIG. 10.

As described above, the electronic apparatus 1 according to one or more embodiments includes the system memory 310 (an example of a memory) which temporarily stores image data of an image captured by the imaging unit 120 (an example of an imaging device), and a processor (for example, the face detection unit 220, the CPU 302, the EC 200, and the like) which executes system processing based on the system program and processing using the image data. For example, the face detection unit 220 performs face detection processing having the standard detection mode (an example of a first detection mode) to detect, with a first detection accuracy (for example, the detection accuracy of the face detection in the HPD processing), a face area with a face captured therein from the image (captured image) of the image data stored in the system memory 310, and the high-precision detection mode (an example of a second detection mode) to detect the face area with a second detection accuracy (for example, the detection accuracy with which face authentication is performed) higher than the first detection accuracy. Further, when the face area is detected in the high-precision detection mode, the face detection unit 220 performs processing (an example of first area setting processing) to set the highly reliable area (an example of a first area) based on the face area detected in the high-precision detection mode. Further, the face detection unit 220 performs face authentication processing in which when the face area detected by the face detection processing is the standard area (an example of a second area) outside the highly reliable area, face authentication is performed based on the face area detected in the standard area. Then, the operation control unit 210 (for example, the EC 200) performs standby state control processing to cause the system to make the transition to the standby state based on the authentication result by the face authentication processing.

Thus, the electronic apparatus 1 determines the face of the user (i.e., that the user is present) without performing the face authentication while the face area is detected in the highly reliable area, and does not perform control to make the transition to the standby state. Only in a case where the detected face area is outside the highly reliable area, the electronic apparatus 1 performs the face authentication, and when there is no face of the user (i.e., when the user is not present), the electronic apparatus 1 makes the transition to the standby state. Therefore, the electronic apparatus 1 can suppress false authentication in the face authentication, and hence can improve security using the face authentication. In other words, the electronic apparatus 1 can improve security by using the face authentication in a limited manner.

Further, the electronic apparatus 1 according to one or more embodiments includes the system memory 310 (the example of the memory) which temporarily stores image data of an image (captured image) captured by the imaging unit 120 (the example of the imaging device), and a processor (for example, the face detection unit 220, the CPU 302, the EC 200, and the like) which executes system processing based on the system program and processing using the image data. For example, the face detection unit 220 performs face detection processing to detect an area, in which a face detection evaluation value (an example of a face-likeness evaluation value) is a face determination threshold value (an example of a first threshold value) or more, as a face area from the image (captured image) of the image data stored in the system memory 310. Further, when the face area in which the face detection evaluation value is a highly reliable threshold value (an example of a second threshold value) or more is detected by the face detection processing, where the highly reliable threshold value is higher than the face determination threshold value, the face detection unit 220 performs processing (the example of the first area setting processing) to set the highly reliable area (the example of the first area) based on the detected face area. Further, the face detection unit 220 performs face authentication processing in which when the face area detected by the face detection processing is the standard area (an example of a second area) outside the highly reliable area, face authentication is performed based on the face area detected in the standard area. Then, the operation control unit 210 (for example, the EC 200) performs standby state control processing to cause the system to make the transition to the standby state based on the authentication result by the face authentication processing.

Thus, the electronic apparatus 1 determines the face of the user (i.e., that the user is present) without performing the face authentication while the face area is detected in the highly reliable area, and does not perform control to make the transition to the standby state. Only in a case where the detected face area is outside the highly reliable area, the electronic apparatus 1 performs the face authentication, and when there is no face of the user (i.e., when the user is not present), the electronic apparatus 1 makes the transition to the standby state. Therefore, the electronic apparatus 1 can suppress false authentication in the face authentication, and hence can improve security using the face authentication. In other words, the electronic apparatus 1 can improve security by using the face authentication in a limited manner.

For example, when two or more face areas are detected in the face detection processing, the face detection unit 220 performs the processing (the example of the first area setting processing) to set the highly reliable area and the face authentication processing based on one of the two or more face areas.

Thus, even when two or more persons are present in front of the electronic apparatus 1, the electronic apparatus 1 can perform face detection and face authentication by setting one person as the user (main user).

As an example, the face detection unit 220 performs the processing (the example of the first area setting processing) to set the highly reliable area and the face authentication processing based on the largest face area among the two or more face areas.

Thus, even when two or more persons are present in front of the electronic apparatus 1, the electronic apparatus 1 can perform face detection and face authentication by setting the closest person as the user (main user).

Further, as an example, the face detection unit 220 performs the processing (the example of the first area setting processing) to set the highly reliable area and the face authentication processing based on the face area closest to the center of the captured image among the two or more face areas.

Thus, even when two or more persons are present in front of the electronic apparatus 1, the electronic apparatus 1 can perform face detection and face authentication by setting the person closest to the front as the user (main user).

Further, after setting the highly reliable area in the processing (the example of the first area setting processing) to set the highly reliable area, the face detection unit 220 changes the position or size of the highly reliable area according to a change in the position or size of the face area detected by the face detection processing.

Thus, even if the position of the face of the user moves a little while the electronic apparatus 1 is in use, the electronic apparatus 1 can perform face detection stably to track the position of the face of the user.

Further, in the processing (the example of the first area setting processing) to set the highly reliable area, the face detection unit 220 releases the highly reliable area based on the fact that the face area detected by the face detection processing is the standard area. In other words, when the face area cannot be detected in the highly reliable area, the face detection unit 220 releases the highly reliable area.

Thus, since the electronic apparatus 1 can suppress any area without the face of the person from being falsely detected as a face area, stable face detection can be performed.

Further, in the processing (the example of the first area setting processing) to set the highly reliable area, when the face authentication result based on the face area detected in the standard area by the face authentication processing is successful, the face detection unit 220 resets the highly reliable area based on the face area detected in the standard area.

Thus, when a face in the face area detected outside the highly reliable area is determined to be the face of the user, the electronic apparatus 1 can perform stable face detection using the face of the user.

For example, the imaging unit 120 includes the RGB sensor (an example of a first image sensor) to image visible light and the IR sensor (an example of a second image sensor) to image infrared light. The standard detection mode is a detection mode to capture an image using only the RGB sensor between the RGB sensor and the IR sensor, and the high-precision detection mode is a detection mode to capture an image using at least the IR sensor.

Thus, the electronic apparatus 1 can detect the face area stably from the captured image captured by using the RGB sensor without using the IR sensor in the standard detection mode. Therefore, since there is no need to emit infrared light, the electronic apparatus 1 can realize stable face detection while suppressing power consumption.

Further, a control method for the electronic apparatus 1 according to one or more embodiments includes: a face detection step having the standard detection mode (the example of the first detection mode) in which the face detection unit 220 detects, with the first detection accuracy (for example, the detection accuracy of the face detection in the HPD processing), a face area with a face captured therein from the image (captured image) of the image data stored in the system memory 310 (the example of the memory), and the high-precision detection mode (the example of the second detection mode) in which the face detection unit 220 detects the face area with the second detection accuracy (for example, the detection accuracy with which face authentication is performed) higher than the first detection accuracy; a first area setting step of setting the highly reliable area (the example of the first area) based on the face area detected in the high-precision detection mode when the face area is detected in the high-precision detection mode by the face detection step; a face authentication step in which when the face area detected by the face detection step is the standard area (the example of the second area) outside the highly reliable area, face authentication is performed based on the face area detected in the standard area; and a standby state control step in which the operation control unit 210 (for example, the EC 200) causes the system to make the transition to the standby state based on the authentication result by the face authentication step.

Thus, the electronic apparatus 1 determines the face of the user (i.e., that the user is present) without performing the face authentication while the face area is detected in the highly reliable area, and does not perform control to make the transition to the standby state. Only when the detected face area is outside the highly reliable area, the electronic apparatus 1 performs the face authentication, and when there is no face of the user (i.e., when the user is not present), the electronic apparatus 1 makes the transition to the standby state. Therefore, the electronic apparatus 1 can suppress false authentication in the face authentication, and hence can improve security using the face authentication. In other words, the electronic apparatus 1 can improve security by using the face authentication in a limited manner.

Further, a control method for the electronic apparatus 1 according to one or more embodiments includes: a face detection step in which the face detection unit 220 detects an area, in which the face detection evaluation value (the example of the face-likeness evaluation value) is the face determination threshold value (the example of the first threshold value) or more, as the face area from the image (captured image) of the image data stored in the system memory 310 (the example of the memory); a first area setting step of setting the highly reliable area (the example of the first area) based on the detected face area when the face area in which the face detection evaluation value is the highly reliable threshold value (the example of the second threshold value) or more is detected by the face detection step; a face authentication step in which when the face area detected by the face detection step is the standard area (the example of the second area) outside the highly reliable area, face authentication is performed based on the face area detected in the standard area; and a standby state control step in which the operation control unit 210 (for example, the EC 200) causes the system to make the transition to the standby state based on the authentication result by the face authentication step.

Thus, the electronic apparatus 1 determines the face of the user (i.e., that the user is present) without performing the face authentication while the face area is detected in the highly reliable area, and does not perform control to make the transition to the standby state. Only when the detected face area is outside the highly reliable area, the electronic apparatus 1 performs the face authentication, and when there is no face of the user (i.e., when the user is not present), the electronic apparatus 1 makes the transition to the standby state. Therefore, the electronic apparatus 1 can suppress false authentication in the face authentication, and hence can improve security using the face authentication. In other words, the electronic apparatus 1 can improve security by using the face authentication in a limited manner.

Next, one or more embodiments of the present invention will be described.

In the above embodiments, the standby state control processing in which when the detected face area is outside the highly reliable area (in the standard area), face authentication is performed, and when it is not the user, the system is controlled to the standby state is described, but this standby state control processing may be temporarily disabled in a state where the electronic apparatus 1 is hand-held. In the state where the electronic apparatus 1 is hand-held, since it is difficult to continue imaging the face of the user stably from the front, it may also be configured not to make the transition to the standby state due to the fact that the face authentication is not performed correctly.

Figure 12:
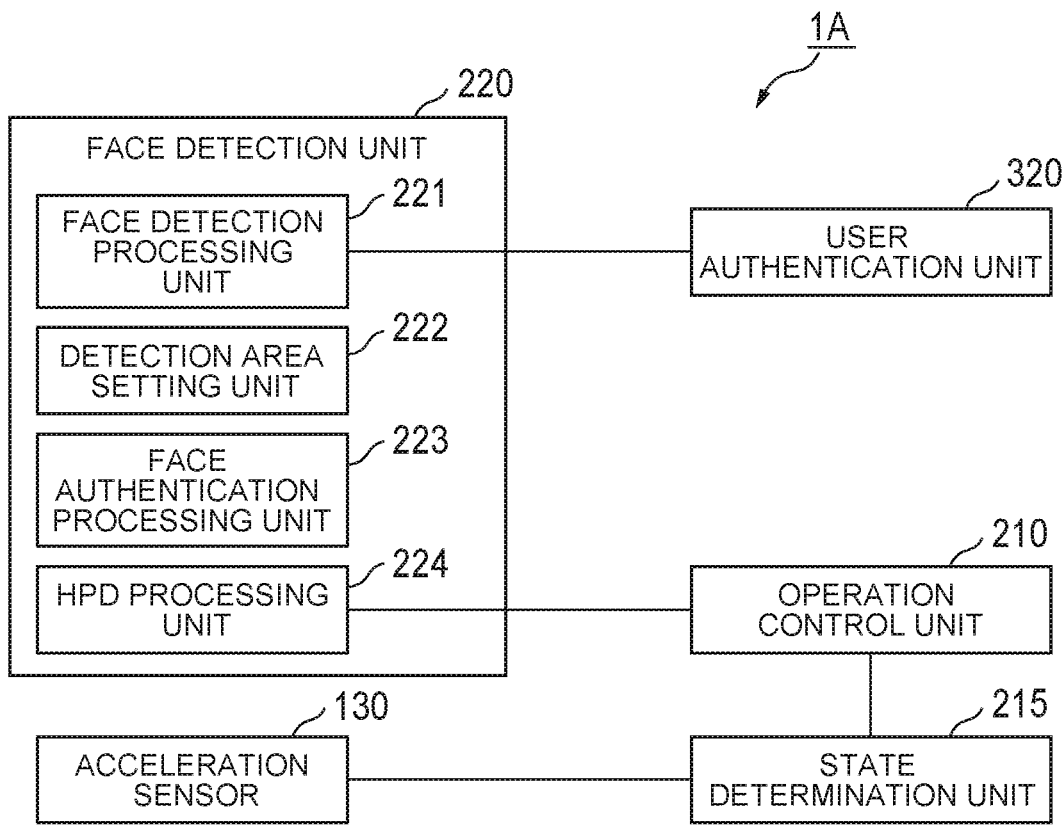
FIG. 12 is a block diagram illustrating an example of the functional configuration of an electronic apparatus according to one or more embodiments.

FIG. 12 is a schematic block diagram illustrating an example of the function configuration of an electronic apparatus 1A according to one or more embodiments. In this figure, components corresponding to the respective units in FIG. 8 are given the same reference numerals. The configuration of the electronic apparatus 1A illustrated is different from the configuration of FIG. 8 in that a state determination unit 215 is included to determine whether or not the electronic apparatus 1A is hand-held using the acceleration sensor 130 to detect the movement of the electronic apparatus 1A. The state determination unit 215 is a functional component implemented, for example, by the EC 200 executing a control program. Note that, like the operation control unit 210, the state determination unit 215 may also be a functional component such as a chipset or a sensor hub instead of the EC 200.

When it is determined by the state determination unit 215 that the electronic apparatus 1A is hand-held, the operation control unit 210 suspends the execution of control processing to output the standby signal for causing the system to make the transition to the standby state based on the authentication result by the face authentication processing unit 223. In other words, in the state where the electronic apparatus 1A is hand-held, the execution of the standby state control processing to control the system to the standby state by the face authentication illustrated in FIG. 11 is suspended.

Figure 13:
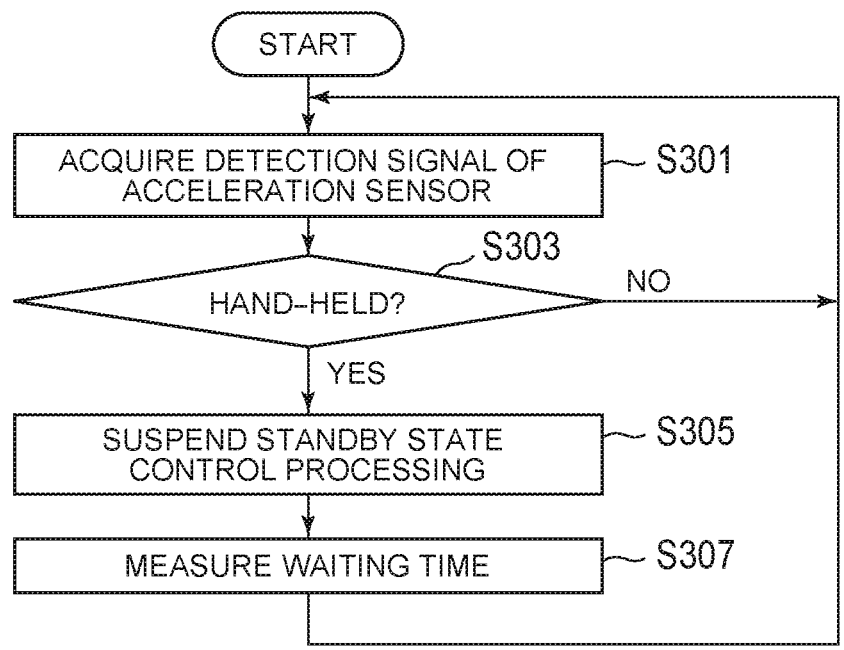
FIG. 13 is a flowchart illustrating an example of processing to suspend standby state control processing according to one or more embodiments.

FIG. 13 is a flowchart illustrating an example of processing to suspend the standby state control processing according to one or more embodiments.

(Step S301) The state determination unit 215 acquires the detection signal of the acceleration sensor 130 to monitor the state of the movement of the electronic apparatus 1A. Then, the state determination unit 215 proceeds to a process in step S303.

(Step S303) Based on the movement of the electronic apparatus 1A monitored from the detection signal of the acceleration sensor 130, the state determination unit 215 determines whether or not the electronic apparatus 1A is hand-held. When determining that the electronic apparatus 1A is hand-held (YES), the state determination unit 215 proceeds to a process in step S305. On the other hand, when determining that the electronic apparatus 1A is not hand-held (NO), the state determination unit 215 returns to the process in step S301 to monitor the state of the movement of the electronic apparatus 1A.

(Step S305) When it is determined by the state determination unit 215 that the electronic apparatus 1A is hand-held, the operation control unit 210 temporarily suspends the execution of the standby state control processing (see FIG. 11) by the face authentication. Then, the procedure proceeds to a process in step S307.

(Step S307) The operation control unit 210 measures a preset waiting time, and continues the state where the execution of the standby state control processing is suspended during a period until the waiting time has elapsed. Then, when the waiting time has elapsed, the operation control unit 210 unsuspends the execution of the standby state control processing, and the procedure returns to the process in step S301.

Thus, the electronic apparatus 1A according to one or more embodiments further includes the state determination unit 215 (for example, the EC 200) for performing determination processing to determine whether or not the electronic apparatus 1A is hand-held using the acceleration sensor 130 (an example of a sensor) to detect the movement of the electronic apparatus 1A. Then, when it is determined by the state determination unit 215 that the electronic apparatus 1A is hand-held, the operation control unit 210 suspends the execution of the standby state control processing to output the information to cause the system to make the transition to the standby state based on the authentication result by the face authentication processing of the face detection unit 220.

Thus, in the hand-held state, since it is difficult for the electronic apparatus 1A to continue imaging the face of the user stably from the front, the transition to the standby state due to the fact that the face authentication is not performed correctly can be prevented.

While the respective embodiments of this invention have been described in detail above with reference to the accompanying drawings, the specific configurations are not limited to those in the embodiments described above, and design changes are also included without departing from the scope of this invention. For example, the respective components described in the above-described embodiments can be combined arbitrarily.

Further, in the aforementioned embodiments, the configuration examples in which the imaging unit 120 is built in the electronic apparatus 1 (1A) are described, but the present invention is not limited thereto. For example, the imaging unit 120 does not have to be built in the electric apparatus 1 (1A), which may also be attachable to the electric apparatus 1 (1A) (for example, onto any one of the side faces 10a, 10b, 10c, and the like) and communicably connected to the electric apparatus 1 (1A) wirelessly or by wire as an external accessory of the electric apparatus 1 (1A).

Further, the electronic apparatus 1 (1A) may also detect a person present in front using a distance sensor (for example, a proximity sensor) together to detect the distance to an object. For example, the distance sensor is provided on the inner face side of the first chassis 10 to detect an object (for example, a person) present in the detection range in the direction (frontward) facing the inner face of the first chassis 10. As an example, the distance sensor may be an infrared distance sensor configured to include a light-emitting part for emitting infrared light and a light-receiving part for receiving reflected light which is the infrared light returned after emitted and reflected on the surface of the object. Note that the distance sensor may be a sensor using infrared light emitted by a light-emitting diode, or a sensor using an infrared laser emitting a light beam narrower in wavelength band than the infrared light emitted by the light-emitting diode. Further, the distance sensor is not limited to the infrared distance sensor, and it may be a sensor using any other method, such as an ultrasonic sensor or a sensor using UWB (Ultra Wide Band) radar, as long as the sensor detects the distance to the object. Further, the distance sensor does not have to be built in the electronic apparatus 1 (1A), which may also be attachable to the electronic apparatus 1 (1A) (for example, onto any one of the side faces 10a, 10b, 10c, and the like) and communicably connected to the electric apparatus 1 (1A) wirelessly or by wire as an external accessory of the electric apparatus 1 (1A). Further, the imaging unit 120 and the distance sensor may be integrally constructed. For example, the distance sensor may also be used upon face authentication processing.

Further, in the aforementioned embodiments, the example in which the face detection unit 220 is provided separately from the EC 200, but some or all of the functions of the face detection unit 220 may be provided by the EC 200, or some or all of the functions of the face detection unit 220 and the EC 200 may be configured as one package. Further, some or all of the functions of the face detection unit 220 may be provided by the system processing unit 300, or some or all of the functions of the face detection unit 220 and some or all of the functions of the system processing unit 300 may be configured as one package. Further, some or all of the functions of the operation control unit 210 may be a functional component of a processing unit (for example, the system processing unit 300) other than the EC 200.

Note that the electronic apparatus 1 (1A) described above has a computer system therein. Then, a program for implementing the function of each component included in the electronic apparatus 1 (1A) described above may be recorded on a computer-readable recording medium so that the program recorded on this recording medium is read into the computer system and executed to perform processing in each component included in the information processing apparatus 1 (1A) described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the electronic apparatus 1 (1A), or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program (s) already recorded in the computer system.

Further, some or all of the functions of the electronic apparatus 1 (1A) in the embodiments described above may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the electronic apparatus 1 (1A) is not limited to the laptop PC, which may be a desktop PC, a tablet terminal device, a smartphone, or the like. Further, the electronic apparatus 1 (1A) is not limited to the PC, the tablet terminal device, the smartphone, or the like, the electronic apparatus 1 (1A) can also be applied to a household electric appliance or a commercial electric appliance. As the household electric appliance, the electronic apparatus 1 (1A) can be applied to a TV set, a refrigerator or a microwave oven having a display unit, or the like. For example, ON/OFF of a TV screen or ON/OFF of a screen of the display unit of the refrigerator or the microwave oven can be controlled in response to the approach or leave of a person. As the commercial electric appliance, the electronic apparatus 1 (1A) can be applied to a vending machine, a multimedia station, or the like. For example, an operating state such as ON/OFF of lighting of the vending machine or ON/OFF of a screen of a display unit of the multimedia station can be controlled in response to the approach or leave of a person.

DESCRIPTION OF SYMBOLS 1 (1A) electronic apparatus
10 first chassis
20 second chassis
15 hinge mechanism
110 display unit
120 imaging unit
121 first camera
122 second camera
130 acceleration sensor
140 power button
150 input device
151 keyboard
153 touch pad
160 video output terminal
200 EC
210 operation control unit
215 state determination unit
220 face detection unit
221 face detection processing unit
222 detection area setting unit
223 face authentication processing unit
224 HPD processing unit
300 system processing unit
302 CPU
304 GPU
306 memory controller
308 I/O controller
310 system memory
320 user authentication unit
350 communication unit
360 storage unit
400 power supply unit

What is claimed is:

1. An electronic apparatus comprising:
a memory which temporarily stores image data of an image captured by an imaging device; and
a processor which executes system processing based on a program of a system and processing using the image data, wherein the processor performs
face detection processing having a first detection mode to detect, with a first detection accuracy, a face area with a face captured therein from the image of the image data stored in the memory, and a second detection mode to detect the face area with a second detection accuracy higher than the first detection accuracy,
first area setting processing to set a first area based on the detected face area when the face area is detected in the second detection mode by the face detection processing,
face authentication processing in which when the face area detected by the face detection processing is a second area outside the first area, face authentication is performed based on the face area detected in the second area, and
standby state control processing to cause the system to make a transition to a standby state based on the authentication result by the face authentication processing.

2. The electronic apparatus according to claim 1, wherein when two or more face areas are detected in the face detection processing, the processor performs the first area setting processing and the face authentication processing based on one of the two or more face areas.

3. The electronic apparatus according to claim 2, wherein the processor performs the first area setting processing and the face authentication processing based on the largest face area among the two or more face areas.

4. The electronic apparatus according to claim 2, wherein the processor performs the first area setting processing and the face authentication processing based on a face area closest to the center of the image among the two or more face areas.

5. The electronic apparatus according to claim 1, wherein after setting the first area in the first area setting processing, the processor changes a position or size of the first area according to a change in the position or size of the face area detected by the face detection processing.

6. The electronic apparatus according to claim 1, wherein in the first area setting processing, the processor releases the first area based on a fact that the face area detected by the face detection processing is the second area.

7. The electronic apparatus according to claim 1, wherein when the face authentication result based on the face area detected in the second area by the face authentication processing is successful, the processor resets, in the first area setting processing, the first area based on the face area detected in the second area.

8. The electronic apparatus according to claim 1, further comprising
a sensor to detect movement of the electronic apparatus, wherein
the processor further performs determination processing to determine whether or not the electronic apparatus is hand-held using the sensor, and
when it is determined that the electronic apparatus is hand-held by the determination processing, the processor suspends execution of the standby state control processing to output information for causing the system to make the transition to the standby state based on the authentication result by the face authentication processing.

9. The electronic apparatus according to claim 1, wherein
the imaging device includes a first image sensor to image visible light and a second image sensor to image infrared light, and
the first detection mode is a detection mode to capture an image using only the first image sensor between the first image sensor and the second image sensor, and the second detection mode is a detection mode to capture an image using at least the second image sensor.

10. An electronic apparatus comprising:
a memory which temporarily stores image data of an image captured by an imaging device; and
a processor which executes system processing based on a program of a system and processing using the image data, wherein the processor performs
face detection processing to detect an area, in which a face-likeness evaluation value is a first threshold value or more, as a face area from the image of the image data stored in the memory,
first area setting processing to set a first area based on the detected face area when the face area in which the evaluation value is a second threshold value or more is detected by the face detection processing, where the second threshold value is higher than the first threshold value,
face authentication processing in which when the face area detected by the face detection processing is a second area outside the first area, face authentication is performed based on the face area detected in the second area, and
standby state control processing to cause the system to make a transition to a standby state based on the authentication result by the face authentication processing.

11. A control method for an electronic apparatus including: a memory which temporarily stores image data of an image captured by an imaging device; and a processor which executes system processing based on a program of a system and processing using the image data, the control method causing the processor to execute:
a face detection step having a first detection mode to detect, with a first detection accuracy, a face area with a face captured therein from the image of the image data stored in the memory, and a second detection mode to detect the face area with a second detection accuracy higher than the first detection accuracy;
a first area setting step of setting a first area based on the detected face area when the face area is detected in the second detection mode by the face detection step;
a face authentication step in which when the face area detected by the face detection step is a second area outside the first area, face authentication is performed based on the face area detected in the second area; and
a standby state control step of causing the system to make a transition to a standby state based on the authentication result by the face authentication step.

12. A control method for an electronic apparatus including: a memory which temporarily stores image data of an image captured by an imaging device; and a processor which executes system processing based on a program of a system and processing using the image data, the control method causing the processor to execute:
a face detection step of detecting an area, in which a face-likeness evaluation value is a first threshold value or more, as a face area from the image of the image data stored in the memory;
a first area setting step of setting a first area based on the detected face area when the face area in which the evaluation value is a second threshold value or more is detected by the face detection step, where the second threshold value is higher than the first threshold value;
a face authentication step in which when the face area detected by the face detection step is a second area outside the first area, face authentication is performed based on the face area detected in the second area; and
a standby state control step of causing the system to make a transition to a standby state based on the authentication result by the face authentication step.

* * * * *